US012223779B2

(12) United States Patent
Borras et al.

(10) Patent No.: US 12,223,779 B2
(45) Date of Patent: Feb. 11, 2025

(54) SYSTEM AND METHOD TO REDUCE PROCESSING LOAD ON BACKEND SERVERS IN A VEHICLE MILES TRAVELED SYSTEM

(71) Applicant: GEOTOLL, INC., Plantation, FL (US)

(72) Inventors: Jaime Andres Borras, Miramar, FL (US); Wyatt Drake Geist, Davie, FL (US)

(73) Assignee: GEOTOLL, INC., Plantation, FL (US)

( * ) Notice: Subject to any disclaimer, the term of this patent is extended or adjusted under 35 U.S.C. 154(b) by 0 days.

(21) Appl. No.: 18/205,387

(22) Filed: Jun. 2, 2023

(65) Prior Publication Data
US 2024/0169768 A1 May 23, 2024

Related U.S. Application Data

(60) Provisional application No. 63/431,548, filed on Dec. 9, 2022, provisional application No. 63/426,472, filed on Nov. 18, 2022.

(51) Int. Cl.
*G07C 5/00* (2006.01)
*G07C 5/08* (2006.01)

(52) U.S. Cl.
CPC ........... *G07C 5/008* (2013.01); *G07C 5/0841* (2013.01)

(58) Field of Classification Search
CPC ............................ G07C 5/008; G07C 5/0841
See application file for complete search history.

(56) References Cited

U.S. PATENT DOCUMENTS 10,959,041 B1\* 3/2021 Burcham ............... H04W 4/021
2005/0256640 A1\* 11/2005 Sigurdsson ............ G07C 5/008
701/468
(Continued)

FOREIGN PATENT DOCUMENTS

GB 2578647 5/2020

OTHER PUBLICATIONS

Publication No. WO2000034897A1 Author: Whipple et al. Title: System and Method for Finding Near Matches Among Records in Database Date: Jun. 7, 2001 (Year: 2001).\*
(Continued)

*Primary Examiner* — James J Lee
*Assistant Examiner* — Steven Vu Nguyen
(74) *Attorney, Agent, or Firm* — The Concept Law Group, PA; Scott M. Garrett; Scott D. Smiley

(57) ABSTRACT

A method and system utilizes a device in a vehicle to periodically determine a location of the vehicle and store, only locally at the device, the location data. The device first detects the vehicle being turned on and identifies the vehicle. After identifying the vehicle the device determines the present location of the vehicle and transmits the present location to a backend server. The server determines the applicable geofence definition including the location and transmits the geofence definition back to the device, whereupon the device commences periodic location fixes, storing each location locally at the device. While performing the location fixes, the device also monitors the present location relative to the geofence definition. If the vehicle is approaching a border or edge of a geofenced region, the device requests a new geofence definition from the server. When the vehicle is shut off, the device transmits the distance driven in each geofenced region to the server. Additionally, the device selects a subset of location fixes to create an (Continued)

auditable record of where the vehicle has travelled, and transmits the record to the server, and then deletes all locally stored location information.

12 Claims, 21 Drawing Sheets

(56) References Cited

U.S. PATENT DOCUMENTS

| | | |
|---|---|---|
| 2012/0215594 A1 | 8/2012 | Gravelle |
| 2013/0031029 A1 | 1/2013 | Davidson |
| 2014/0330453 A1* | 11/2014 | Nakagawa ............... B60L 53/63 |
| | | 701/2 |
| 2017/0366930 A1 | 12/2017 | Treman et al. |
| 2019/0057556 A1 | 2/2019 | Gravelle |
| 2019/0318398 A1* | 10/2019 | Borras ................ G07B 15/063 |
| 2020/0013241 A1* | 1/2020 | Johnson ................ B60R 25/248 |
| 2020/0169836 A1* | 5/2020 | Treman .................. H04W 4/44 |
| 2020/0294016 A1* | 9/2020 | Jiang ...................... G06Q 40/02 |
| 2021/0174671 A1* | 6/2021 | Borras ................. H04W 4/021 |
| 2021/0183175 A1* | 6/2021 | Dunger ............... G06Q 20/145 |

OTHER PUBLICATIONS

Partial European Search Report for European Application No. 23210610.4, Apr. 8, 2024.

* cited by examiner

SYSTEM AND METHOD TO REDUCE PROCESSING LOAD ON BACKEND SERVERS IN A VEHICLE MILES TRAVELED SYSTEM

CROSS REFERENCE

This application claims priority to provisional application No. 63/426,472, filed Nov. 18, 2022, and to provisional application No. 63/431,548, filed Dec. 9, 2022, the entireties of each of which are hereby incorporated by reference.

FIELD OF THE DISCLOSURE

The present disclosure relates generally to a system for determining the distance driven by a vehicle, and, more particularly, relates to determining the location and time where a vehicle was driven for the purpose of assessing a road usage charge using a distributed ledger while also maintaining the privacy of the users. Further, the disclosure relates to a method and system for reducing the processing load on the backend servers while preserving an auditable log of travel.

BACKGROUND OF THE DISCLOSURE

It is well known that governments assess a tax on gasoline that is used to pay for roadway maintenance. Typically there are both national and subdivision jurisdictions assess taxes. These taxes are collected through the gasoline retailer and paid to the respective governmental entities. One way people avoid the gasoline tax is by driving electric vehicles, which do not operate on gasoline. The rise in popularity of electric vehicles has affected the tax collections relative to road usage. That is, the tonnage traversing roads, and therefore wearing on the roads, has steadily increased, and the revenue from gasoline tax has not kept pace. Increasing fuel efficiency of vehicles in general, as well as the popularity of electric vehicles has led to less tax being raised per unit tonnage traversing roadways. This means that as the need for maintenance has increased, the funds generated by fuel taxes have diminished relative to that need.

As a result, many jurisdictions are looking into implementing a road use charge in which drivers pay a fee for the number of miles driven by a vehicle. This raises a number of issues in implementation such as how the distance driven is tracked, how it can be used to incentivize drivers to be efficient, and charge premiums for access to congested areas. There are numerous ways in which this can be done, most of which raise privacy concerns as people are not always comfortable with the government having a record of where and when they travelled. As a result, people are extremely hesitant to accept a system where their vehicle's location is continuously reported to a governmental agency, as well as having any device in their vehicle that "tracks" their movement.

Furthermore, a system in which there is continuous periodic reporting of location to a backend server would result in huge amounts of location data being processed by the backend server(s). Each location record is about 300 bytes. One minute's worth of location data is then about 1.8 KB, and an hour of location data is about 108 MB of data. Multiply these numbers by millions or tens of millions of vehicles being driven and it's easy to see the load on the servers.

Therefore, a need exists to overcome the problems with the prior art as discussed above.

SUMMARY OF THE DISCLOSURE

In accordance with some embodiments of the inventive disclosure, there is provided a method for determining distance driven in a vehicle for road usage charge that includes, at a device in a vehicle, detecting that the vehicle has been turned on. The method further includes, responsive to detecting that the vehicle has been turned on, the device determining a present location of the vehicle, and, responsive to determining the present location of the vehicle, transmitting the present location to a backend server. The method further includes receiving from the server a geofence definition for a region including the present location, and in response to receiving the geofence definition, commencing periodically and repeatedly determining a new location fix including a location and time and storing each new location fix, wherein each new location is stored locally in the device only while the vehicle is turned on. The method further includes, while periodically and repeatedly determining each new location the device comparing each new location to the geofence definition. The method further includes the device determining that the vehicle has been turned off, and, responsive to the device determining that the vehicle has been turned off, the device determining a distance drive in the geofence definition and transmitting the distance driven and a geofence definition identifier to the backend server. The method also includes the device creating an auditable record by selecting a subset of the location fixes and transmitting the auditable record to the backend server.

In accordance with a further feature, detecting that the vehicle has been turned on comprises the device connecting to an audio system of the vehicle using a wireless personal area network link.

In accordance with a further feature, detecting that the vehicle has been turned on comprises power being provided at an on-board diagnostic (OBD) port to which the device is coupled.

In accordance with a further feature, determining the present location of the vehicle is performed by the device coupled to the OBD port, and transmitting the present location is performed by the device coupled to the OBD port first transmitting the present location to a cellular telephone device that is wirelessly coupled to the device coupled to the OBD port, and the cellular telephone device transmitting the present location to the backend server.

In accordance with a further feature, creating the auditable record comprises selecting every nth location fix, where n is an integer between 5 and 100.

In accordance with a further feature, creating the auditable record comprises selecting location fixes that are not more than a selected distance apart.

In accordance with a further feature, subsequent to transmitting the auditable record to the backend server, the backend server creating a block in a blockchain that includes the auditable record.

In accordance with a further feature, responsive to comparing each new location to the geofence definition, the method further includes determining that the vehicle is approaching a boundary of the geofenced definition, and responsive to determining that the vehicle is approaching the boundary of the geofenced definition, the device requesting and receiving from the backend server a new geofenced definition for a region adjacent to the region of the geofenced definition. In addition, the method include using the new geofenced definition upon the vehicle entering the adjacent region.

In accordance with some embodiments of the inventive disclosure, there is provided a method for determining distance driven in a vehicle for a road usage charge that includes receiving, at a device associated with the vehicle, each time the vehicle is turned on, a plurality of geofenced definitions from a backend server, each geofenced definition of the plurality of geofenced definitions corresponding to a unique geographic region of a respective plurality of contiguous geographic regions. The method also includes periodically performing a location fix that indicates a present location of the vehicle, and storing a result of each location fix at the device only to produce a plurality of stored location fixes. The method also includes comparing each location fix to a present one of the plurality of geofenced definitions, and when the location fix indicates that the vehicle has travelled into a new geofenced region, the device transmitting a distance driven in the geofenced definition to the backend server. The method also includes determining that the vehicle has been turned off, and in response selecting a subset of location fixes of the plurality of stored location fixes to create an auditable record indicating where the vehicle has travelled and transmitting the auditable record to the backend server.

In accordance with a further feature, prior to performing the method of claim 9, the device detects that the vehicle has been turned on.

In accordance with a further feature, determining that the vehicle has been turned on comprises detecting an automatic wireless link has been established with an audio system of the vehicle.

In accordance with some embodiments of the inventive disclosure, there is provided a method that includes performing a set up process for road usage charge application program that includes, at a cellular telephone device, connecting over a wireless link to a vehicle audio system, and obtaining a media access control (MAC address of the vehicle audio system of a vehicle. The cellular telephone device, while connected to the vehicle audio system, performs an optical character recognition of a vehicle identification number (VIN) of the vehicle, and responsive to the cellular telephone device recognizing the VIN, the cellular telephone device associates the MAC address with the VIN in storage by the cellular telephone device. Subsequent to performing the set up process, the cellular telephone device detects that the vehicle has been turned on based on the cellular telephone device automatically connecting the vehicle audio system and receiving the MAC address from the vehicle audio system. Responsive to detecting that the vehicle has been turned on, the cellular telephone device determines a present location of the vehicle, and responsive to determining the present location of the vehicle, transmits the present location to a backend server as an initial, one time matter. The method further includes receiving from the server a geofence definition for a region including the present location, and, response to receiving the geofence definition, commencing periodically and repeatedly determining a new location fix including a location and time and storing each new location fix to create a plurality of stored location fixes, wherein each new location is stored locally in the cellular telephone device only while the vehicle is turned on. While periodically and repeatedly determining each new location the device compares each new location to the geofence definition. The method also includes determining that the vehicle has left a region corresponding to the geofenced definition and in response determining, from the plurality of stored location fixes, a total distance driven in the geofenced definition and transmitting the total distance driven to the backend server. The device also determines that the vehicle has been turned off, and responsive to the cellular telephone device determining that the vehicle has been turned off, the device determines a distance drive in the geofence definition and transmitting the distance driven and a geofence definition identifier to the backend server. The method also includes the cellular telephone device creating an auditable record by selecting a subset of the location fixes and transmitting the auditable record to the backend server.

Although the invention is illustrated and described herein as embodied in a system and method to preserve privacy in a VMT system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. To the extent that the inventive disclosure relies on or uses software or computer implemented embodiments, the terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances.

BRIEF DESCRIPTION OF THE DRAWINGS

The figures of the appendix serve to further illustrate various embodiments and explain various principles and advantages all in accordance with the present invention.

DETAILED DESCRIPTION

While the appendix shows and describes the various drawing contained therein, the following additional discussion is provided to further explain the embodiments. It is to be understood that the disclosed embodiments are merely exemplary of the invention, which can be embodied in various forms.

Figure 1:
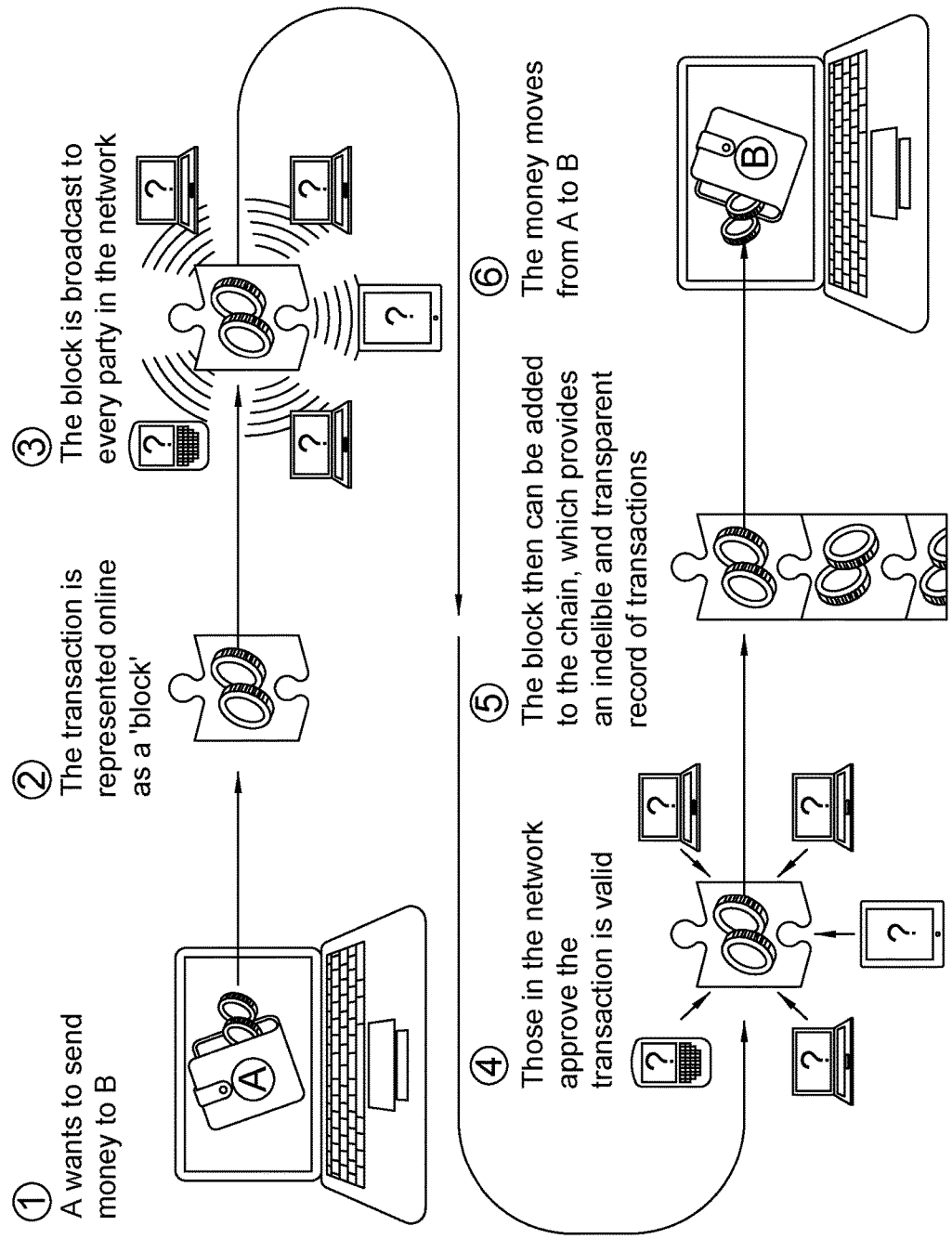
FIG. 1 shows a prior art block chain technology.

FIG. 1 shows a prior art block chain technology. In general, at 1 a first user wants to send money to a second user or some other entity. Each entity has a digital wallet that is assigned unique wallet address, A transaction is logged in the distributed ledger of the blockchain indicating an amount of money from the first user to the second user's digital wallet. To verify this, at 2 a block is created with details of the transaction. In 3 all of the parties on the blockchain network have their copies of the distributed ledger updated with transaction. In 4 entities prove the transaction by a mining operation, which indicates the transaction is valid, and the distributed ledgers are then updated accordingly in 5, and in 6 the receiving entity is credited with the funds in their digital wallet. This is a rough overview of a basic blockchain system.

Figure 2:
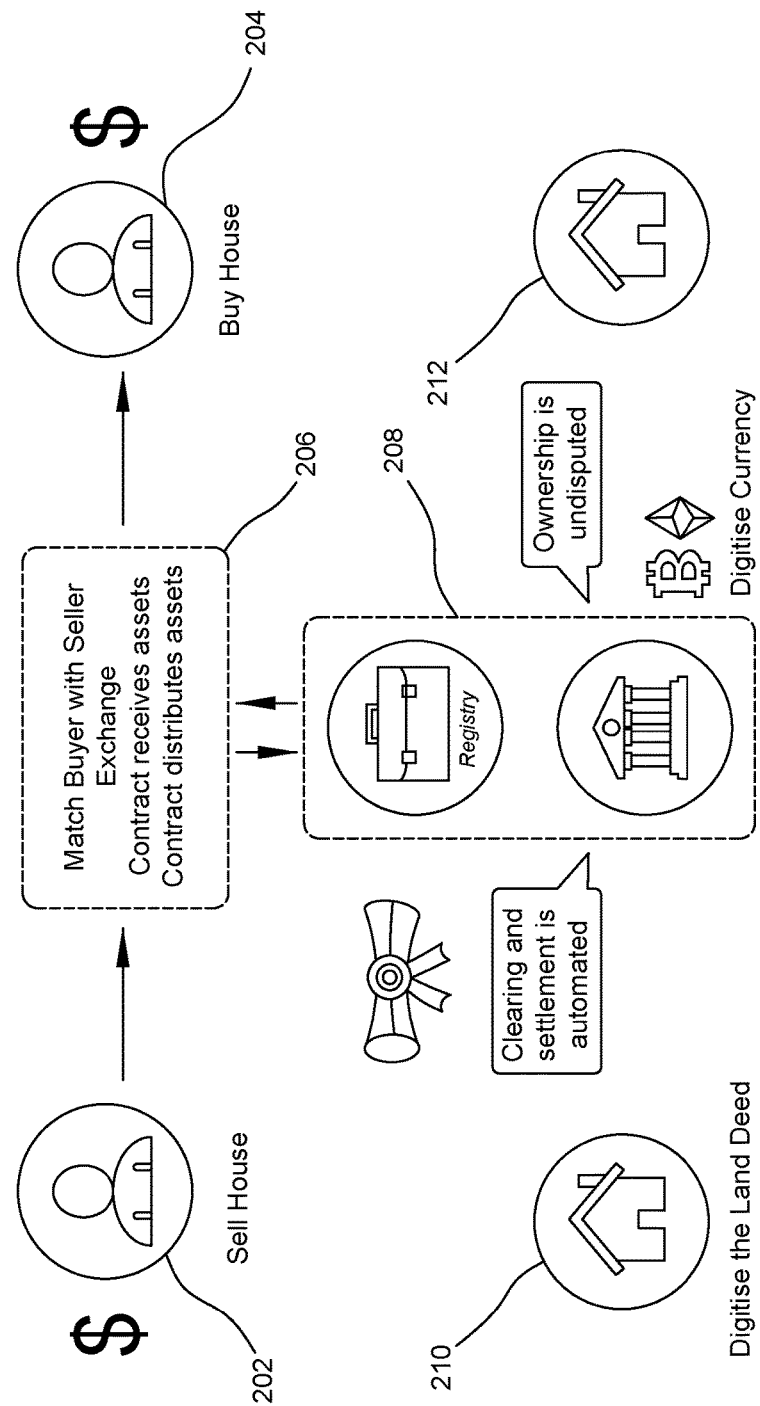
FIG. 2 shows an example of a smart contract in a block chain in accordance with the prior art.

FIG. 2 shows an application of a smart contract in a blockchain system 200, in accordance with the prior art. The blockchain system can be, for example, the Ethereum network. Briefly, a homeowner 202 wants to sell their house to a buyer 204. A smart contract 206 on a blockchain network is created that sets out the conditions for the sale. Documents and funds are tracked through a registry entity 208 that determines which conditions have been met in an automated process. Once all the conditions of the smart contract 206 are met, the completed status of the smart contract is verified by the blockchain network and added to the distributed ledger, and the deed to the property can be digitized 210, and thereafter the property 212 is owned by the buyer 204. Thus, smart contracts can be used to automate the verification of transactions that have conditions.

Figure 3:
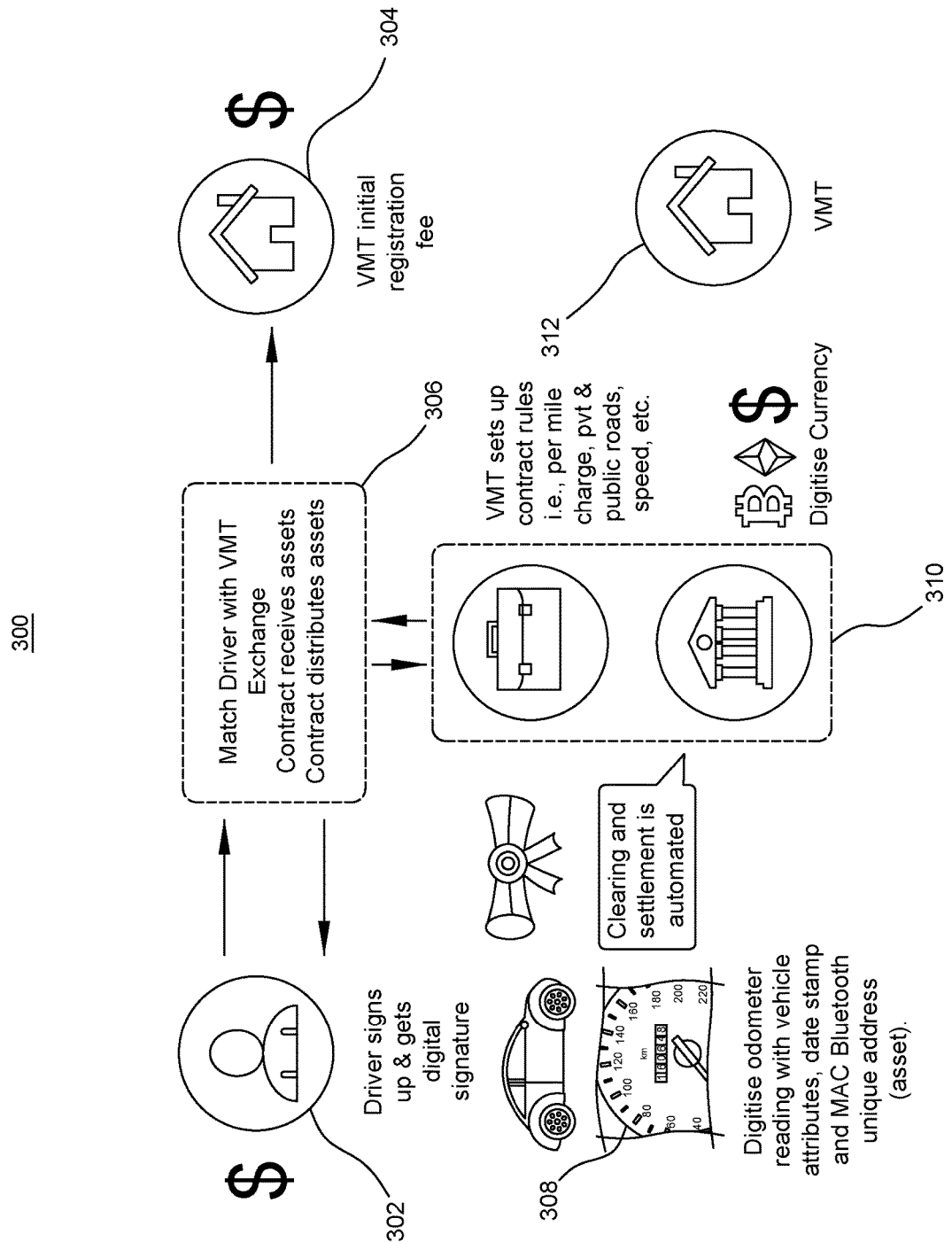
FIG. 3 shows an example of a Vehicle Miles Travelled (VMT) system registration using a smart contract in a block chain system, including an example of how payment is made in the inventive system using a smart contract in a block chain system, in accordance with some embodiments.

FIG. 3 shows an overview of a process of using smart contracts for a Vehicle Miles Travelled (VMT) payment system, in accordance with some embodiments. A VMT system allows vehicle operators to pay a tax based on vehicle usage, and specifically based on miles driven on public roads, as a supplement or alternative to taxes on fuel. The first step to using the system is for a user 302 to register a vehicle 308 with a VMT payment processor (VMTPP) 312 and pay an initial registration fee 304. The mileage of the vehicle is proven, such as by taking a picture of the odometer using the mobile device while the mobile device is also paired with the audio system of the vehicle. This can be done through an application program for a VMTPP that is installed on a mobile device. The user 302 can set up an account with the VMTPP, which is essentially a blockchain wallet that is accessible by one or more VMT agencies. A smart contract 306 is then set up that corresponds to a particular vehicle 308. In order to verify the mileage on the vehicle at registration time, the user turns on the vehicle 308, which allows the user's mobile device to connect with the audio system of the vehicle using BlueTooth, for example. The application program, once it detects the connection to the vehicle's audio system, then prompts the user to take an image of the vehicle odometer while the connection is maintained. In more sophisticated vehicles, the vehicle will have a user-accessible computing interface that will allow the user to install application programs that can be run/ executed by the vehicle computing system and directly obtain the mileage reading. In some embodiments the user's mobile device can interact with the vehicle computing system to obtain mileage information from the vehicle computing system. In some embodiments the vehicle will also have its own mobile communication system, obviating the need to use a handheld mobile device, and the vehicle computing system can directly communicate with the VMTPP 304 and conduct the registration. The registration process includes establishing an encrypted smart contract 306 that establishes the rules and fees applied to the roadways travelled by the vehicle 308. The cryptographic key for decrypting the smart contract 306 can be shared by the user with the VMTPP and changed periodically for security. The smart contract 306 can also include payment information that the VMTPP can use to collect payment (e.g. credit card information). The smart contract includes various rules 310 for calculating the payment owed, when payments are made, and so on, as will be described in more detail subsequently herein. Once the rules are satisfied, or otherwise trigger a payment, then the VMTPP 312 processes payment and the transaction is recorded on the blockchain. The contract rules are provided to the smart contract 306 by the VMTPP 312, and can be provided to the user 302 before the user agrees to the smart contract. Periodically the user can report miles driven, where those miles were driven, time of day, and any other conditions that may affect the calculation of the amount owed. The reporting is done by the mobile phone application, which can track location, distance driven, time of day, day of the week, and so on, and that data can be supplied as an input or asset of the smart contract 306.

Figure 4A:
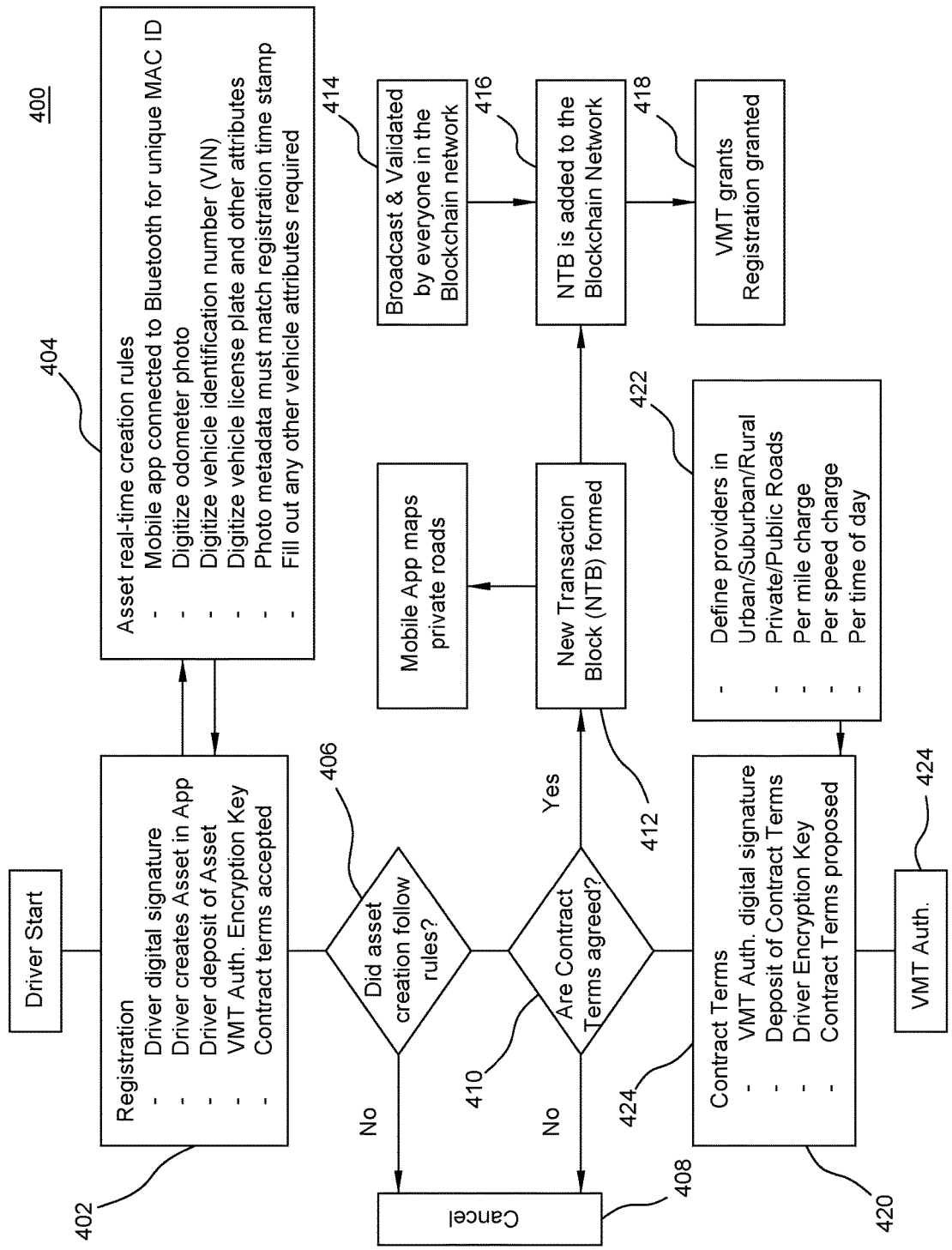
FIG. 4A shows a registration flowchart illustrating, in finer detail, the process of FIG. 3.
Figure 4B:
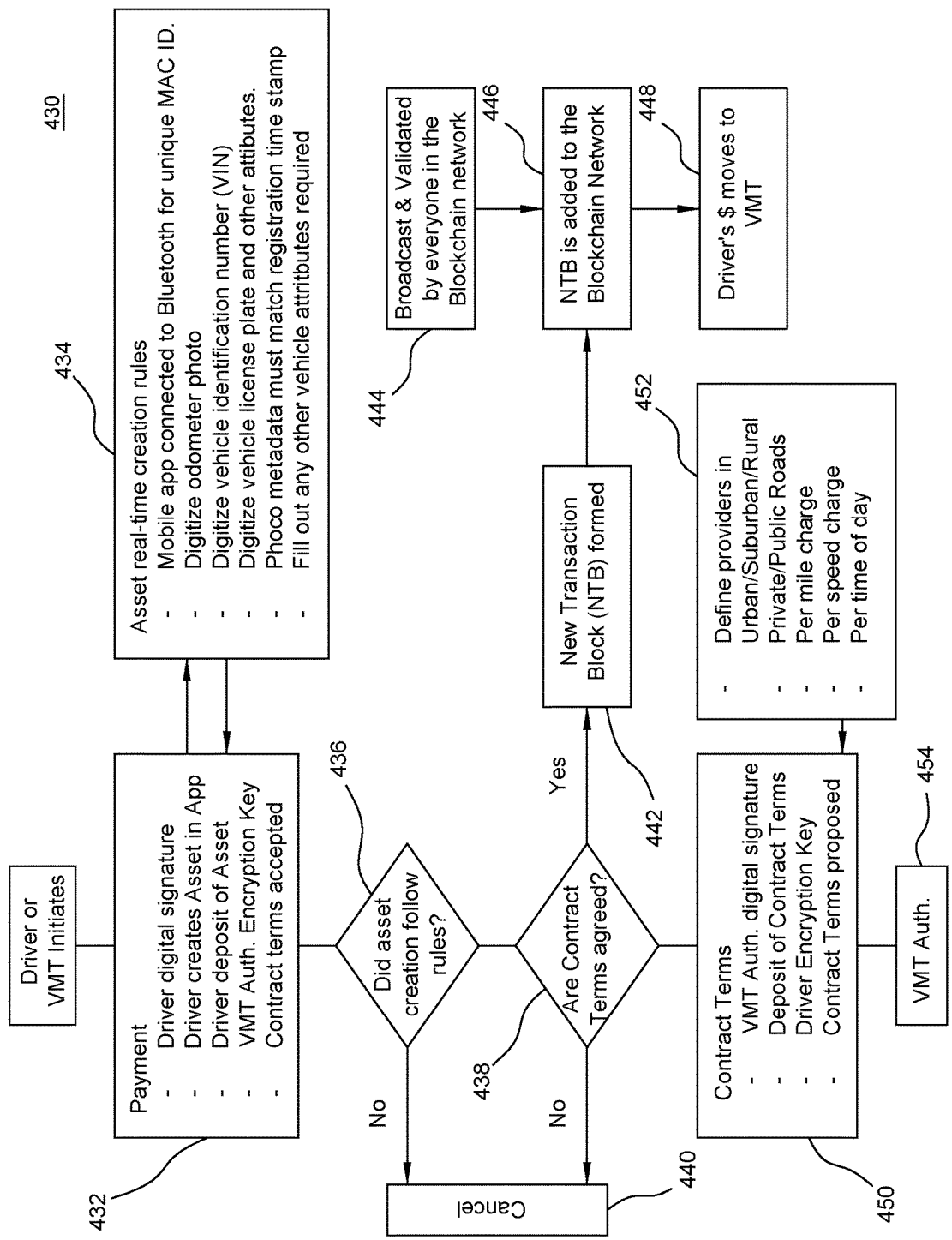
FIG. 4B shows a payment flowchart illustrating, in finer detail, the process of FIG. 3.

For a payment transaction the process of FIG. 4B is followed, but briefly, with further reference to FIG. 3, the process is carried out periodically and can be driven by either the user or the VMTPP. Periodically the VMTPP can send a request for reconciliation, or the user's mobile device can periodically provide miles driven information (distance, location, time, etc.). In general, every time a user pays the assessed fee a new transaction block is created as a record. The new transaction block is appended to the user's most recent block. Thus, the first transaction block will be appended to the user's registration block. The distance driven, where (e.g. classification), time when driven, and any other parameter that may affect the fee assessed or which may adjust or exempt a fee is included. As the user drives, either the user's mobile device can relay location information to a third party that is then compared to geofenced street/road regions, the user's mobile device can perform this function locally at the mobile device, or the vehicle computing system can perform this task. The third party can be a toll facilitator that has mapped out geofenced regions to define the various roadways as toll roads, urban road, suburban roads, rural roads, private roads, and special conditions that may apply to any of them such as time of day adjustments, congestion adjustments, high occupancy vehicle adjustments, and so on. Accordingly, a record is maintained of what type of roadways have been driven, the distance driven for each of them, and the resulting total VMT assessment. Then the new transaction block is created and authenticated using mining operations to verify the block, and funds are transferred to pay the amount due.

FIG. 4A shows a flow chart diagram of a method 400 for registering a vehicle for VMT payment, in accordance with some embodiments. In the initial registration 402 a user or driver provides or creates a digital signature, an asset in the application program of the user's mobile device that will correspond to the particular vehicle being registered, and a deposit of funds or payment information to allow funds to be transferred. In step 404, the asset creation can include connecting the mobile device to the vehicle audio system, which allows the mobile device to obtain the media access controller (MAC) address of the vehicle audio system. The MAC address is a unique identifier that is hard coded in the audio system's wireless transceiver. The odometer, vehicle identification number (VIN), and license plate can both be photographed with the mobile device while it is in wireless communication or linked with the vehicle audio system. The mobile device can also generate a VMT authorization encryption key in step 402. Then the asset (the collection of vehicle data and images) is transferred to the VMT agency or VMTPP for evaluation. In step 406 the VMT authority evaluates the data to ensure all of the rules have been followed. If not, then the registration is cancelled (408) and a deficiency notice can be transmitted back to the mobile device for rectification by the user. In step 410 the VMT authority determines if the contract terms have been properly assented to, and if not then the process is cancelled (408) and a deficiency notice can be sent back to the user's mobile device. If the asset creation rules are followed, and the contract terms are agreed to, then in step 412 the VMT authority can create a new transaction block for the vehicle. This is essentially the start of an account on the system blockchain. The mobile application on the user's mobile device can then start tracking the movement of the vehicle on a map provided by a navigation program, or by using defined geofence regions used by a tolling service to identify roads. In step 414 the new transaction block is processed by the blockchain and provided to all entities holding a copy of the distributed ledger, and in step 416 the new transaction block is added to the blockchain network and in step 418 the vehicle registration in the VMT blockchain system is granted, meaning the user is notified by sending a message to the user's mobile device.

Returning to step 410, the contract terms are agreed to in step 420 by receiving the terms from the VMT authority in step 422. The terms define rates for various locales, such as urban, suburban, and rural regions which indicate the rate per distance driven, and any modifiers such as speed or time of day modifiers that can modify the rate charged. In step 420 the contract terms are collected and signed using the user's cryptographic key and the VMT authority's cryptographic key (provided in step 424). This information is added to the new transaction block in step 412.

In FIG. 4B there is shown a flowchart diagram of a method 430 for payment of a VMT fee, using a blockchain, in accordance with some embodiments. The method 430 also expands on that discussed briefly in reference to FIG. 3. In step 432, the user of the vehicle must again create an asset or asset file, substantially as in step 404. The asset is digitally signed by the user's mobile device by applying the user's cryptographic key, indicating that contract terms are accepted. Steps 436, 438, and 440 are processed substantially the same as steps 406, 410, 408, respectively. In steps 450, 452, and 454 the VMT authority provides, for example, the rates to be applied to distance driven under various conditions and locations, and the user/driver and VMT authority both sign the contract terms with their respective cryptographic keys to form a new transaction block in step 442. In step 444 the new block is then added to the distributed ledger of the blockchain network and validated, then in step 446 the block is recorded as being validated. In step 448, since the smart contract has been satisfied, funds are paid to the VMT authority.

Figure 5:
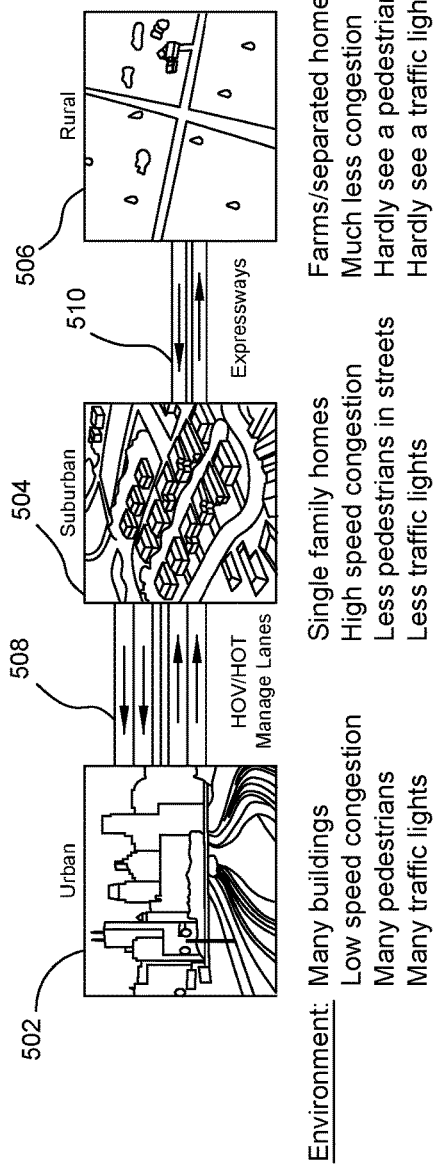
FIG. 5 shows a table including examples of how the fee charged for road usage by a vehicle can be varied based on road type, location, the time of day, and other factors.

In FIG. 5 of the appendix a table is shown in which differing rates are applied to roadways based on the type of roadway as well as the conditions (e.g. time of day, congestion relief) that may increase the fee over the basic fee. Three types of regions are shown as well, urban 502, suburban 504, and rural 506. Each of these regions can have a different base rate, or different surcharges, or both. In urban and suburban regions there can be toll roads such as high occupancy lanes 508 in roads that allow people to use less congested lanes for a fee. In between rural and suburban regions there are expressways 510 that can require a toll, on additional to standard miles driven charges. The various types of roadways 508, 510 can have different charges applied, based on location. Table 512 shows examples of how rates can vary based on location, time of day, and day of the week. Other rate modifiers can be used as well, such as, for example, a surcharge for heavy vehicles, or a discount for light vehicles or motorcycles.

Figure 6:
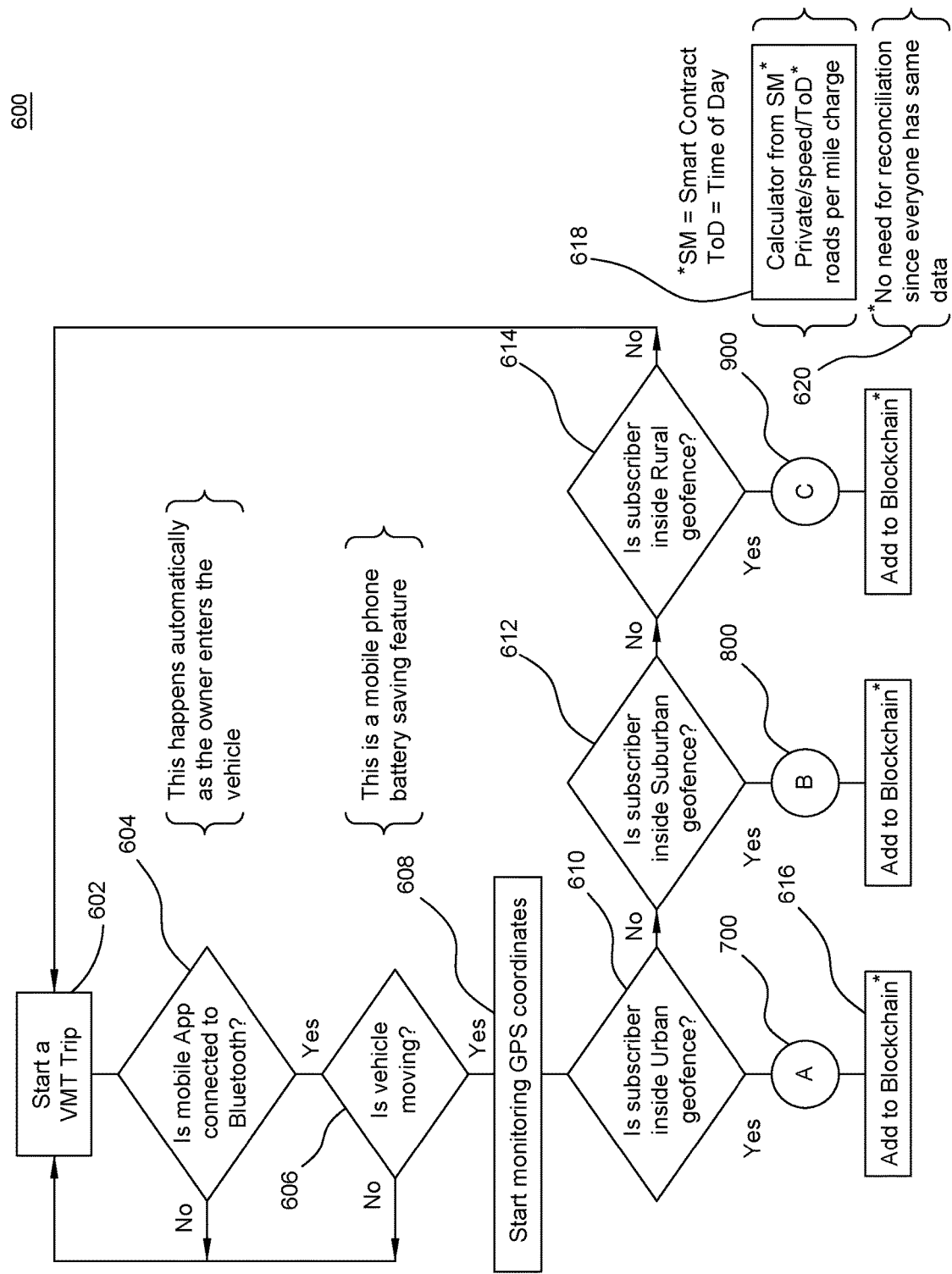
FIG. 6 shows a flowchart of a method for initiating a trip that is monitored for VMT fee assessment, in accordance with some embodiments.

In FIG. 6 a flow chart diagram is shown for a method 600 of determining which the type of region a driver is in using geofence definitions. At the start 602 the driver may ensure that the mobile phone application is running in order to track distance driven as well as other relevant factors that can modify the rate charged. In step 604 the mobile device determines if it is connected to the vehicle audio system by, for example, a wireless networking link. In step 606 the mobile device, using location tracking, can determine whether the vehicle is moving. Once the vehicle starts moving, then location coordinates can be collected in step 608, and then evaluated based on geofence definitions. In steps 610, 612, and 614 the method 600 applies the location to geofence definitions to determine whether the vehicle is in an urban geofence (610), a suburban geofence (612), or a rural geofence (614). If any of these apply, then a corresponding rate charge determination method 700, 800, or 900 is followed, respectively. As indicated in step 618, based on the smart contract, the road type (public/private), speed, time of day, and distance driven can be used in each of the methods 700, 800, 900. Once the proper method 700, 800, or 900 is conducted, then a block is added for the vehicle to the blockchain and funds can then be transmitted accordingly, as in step 616 (which is identical for methods 800 and 900). As indicated in section 620, the benefit this process is that the need for conventional reconciliation is avoided as the data is verified via the blockchain.

Figure 7:
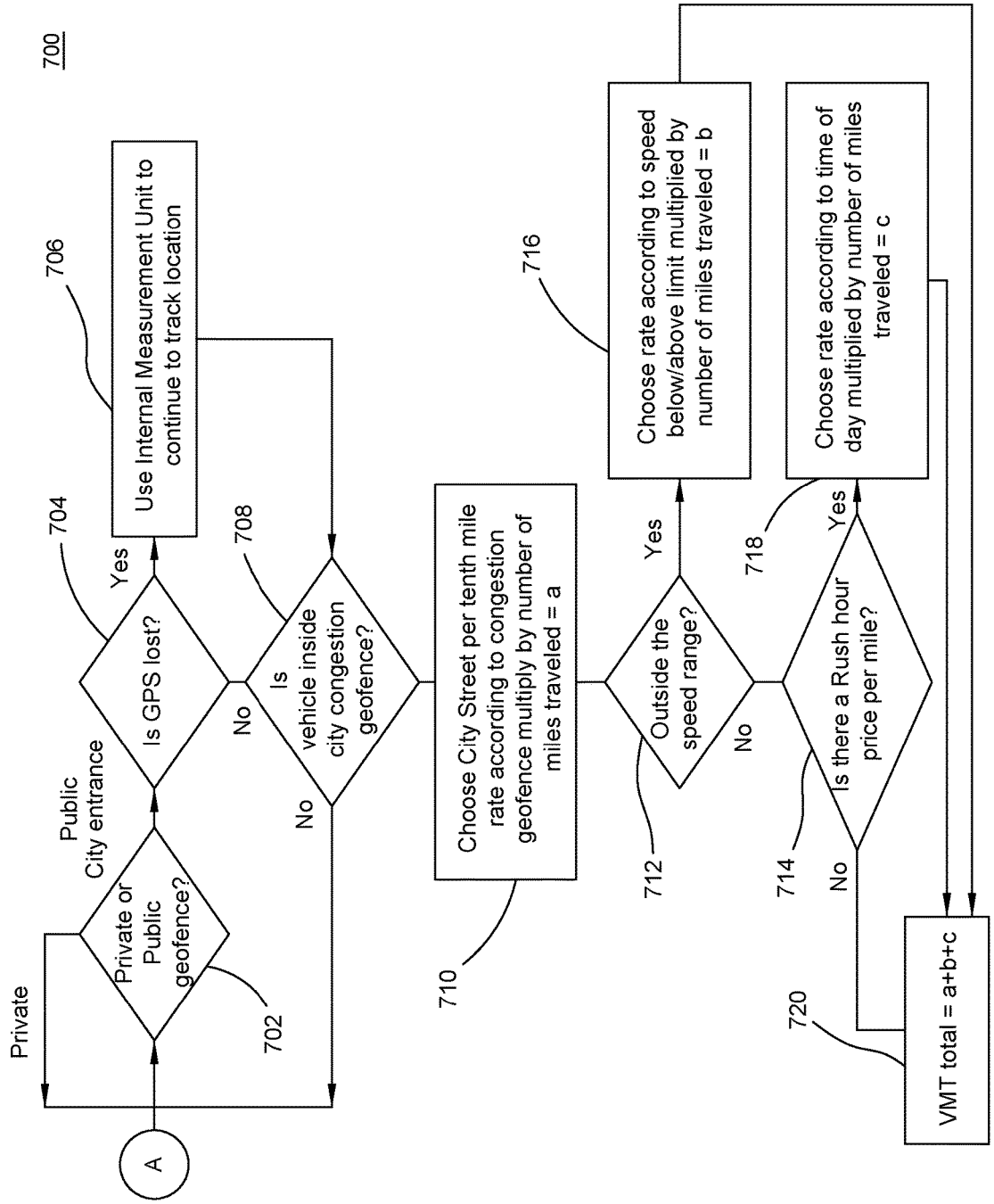
FIG. 7 shows a flowchart diagram of a method for operating the VMT fee assessment in an urban locale, in accordance with some embodiments.

FIG. 7 shows a flowchart diagram of a method 700 for determining an applicable VMT rate when the vehicle is in an urban locale, in accordance with some embodiments. If the answer to step 610 is "yes," then this method 700 is followed. In step 702 the mobile device determines whether the vehicle is on a public or private road. If the vehicle is on a private road, then no charge is applied. Once the vehicle enters a public road then in step 704 the location is tracked using, for example, GPS coordinates produced by the on-board GPS receiver of the mobile device (or that in the vehicle for more advanced vehicles). If the GPS signal is lost, then in step 706 inertial tracking can be used, such as by a multi-axis accelerometer in the mobile device. In step 708 the method 700 determines if the vehicle is also in a congestion zone, if yes, then a multiplier "a" is used in step 710. Then in steps 712, 714 the method determines whether the vehicle is driven within an allowed speed range, and if the vehicle speed is outside of the speed range a factor "b" is applied in step 716. If in step 714 the vehicle is driving during a high congestion time (e.g. "rush hour"), then a factor "c" is applied in step 718. In step 720 the factors "a," "b," and "c" are summed if they are to be applied to a base rate, and the modified rate is thereby determined.

Figure 8:
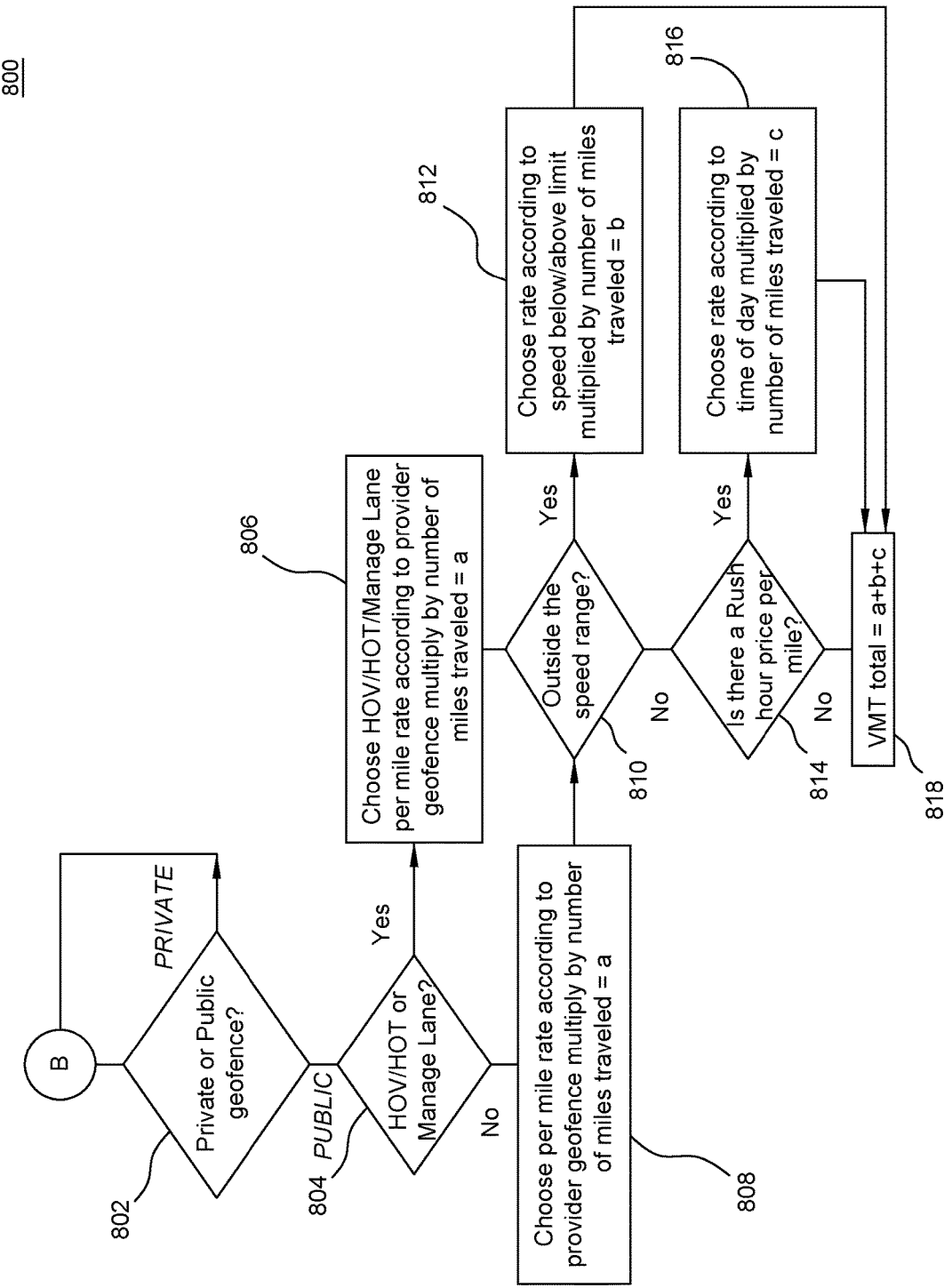
FIG. 8 shows a flowchart diagram of a method for operating the VMT fee assessment in a suburban locale, in accordance with some embodiments.

In FIG. 8 there is shown a flowchart diagram of a method 800 for determining an applicable VMT rate when the vehicle is in an urban locale, in accordance with some embodiments. If the answer to step 612 is "yes," then this method 800 is followed. In step 802 the mobile device determines whether the vehicle is in a public or private roadway. VMT charges only apply when the vehicle is driven on public roads. In step 804 it is determined whether the vehicle is on a restricted lane, such as for HOV use. If yes, then in step 806 a toll factor "a" is used. If not, then in step 808 the factor "a" is based on a base rate corresponding to the geofenced region in which the vehicle is located. Then in steps 810 and 814 the method determines whether the vehicle is within a predefined speed range, and whether the time of day indicates, for example, and rush hour charge. In steps 812 and 816 factors "b" and "c" are added to the calculation if their respective decision steps are affirmative. In step 818 the applicable factors are summed and applied to modify the base rate which is applied to the distance driven.

Figure 9:
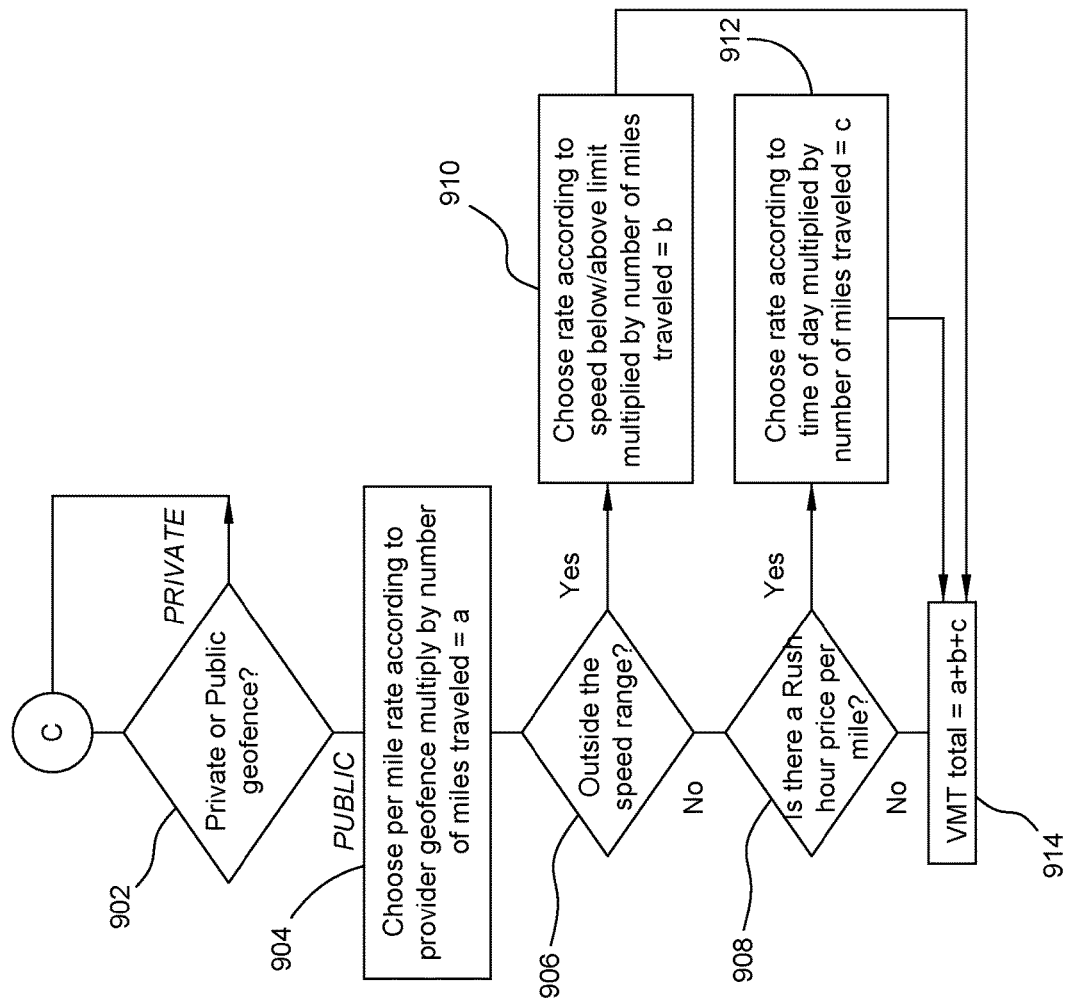
FIG. 9 shows a flowchart diagram of a method for operating the VMT fee assessment in a rural locale, in accordance with some embodiments.

In FIG. 9 there is shown a flowchart diagram of a method 900 for determining an applicable VMT rate when the vehicle is in an urban locale, in accordance with some embodiments. If the answer to step 614 is "yes," then this method 900 is followed. Step 902 ensures charges are only applied if the vehicle is on public roads. In step 904 the base rate "a" for rural roads is determined, and in steps 906 and 908 the speed and time of day factors "b" and "c," respectively are applied in steps 910, 912, if applicable. In step 914 the factors are summed and applied to the distance units driven to determine the VMT charge.

In each of methods 700, 800, 900, the VMT charge is determined upon the vehicle turning off (e.g. loss of connection to the vehicle audio system and the mobile device is not moving). But a partial VMT charge can also be determined when leaving one region for another, or when any of the factor change, such as the vehicle entering a HOV lane, or being driving when rush hour starts. These partial charges are accumulated and summed when the vehicle is no longer being driven.

Figure 10:
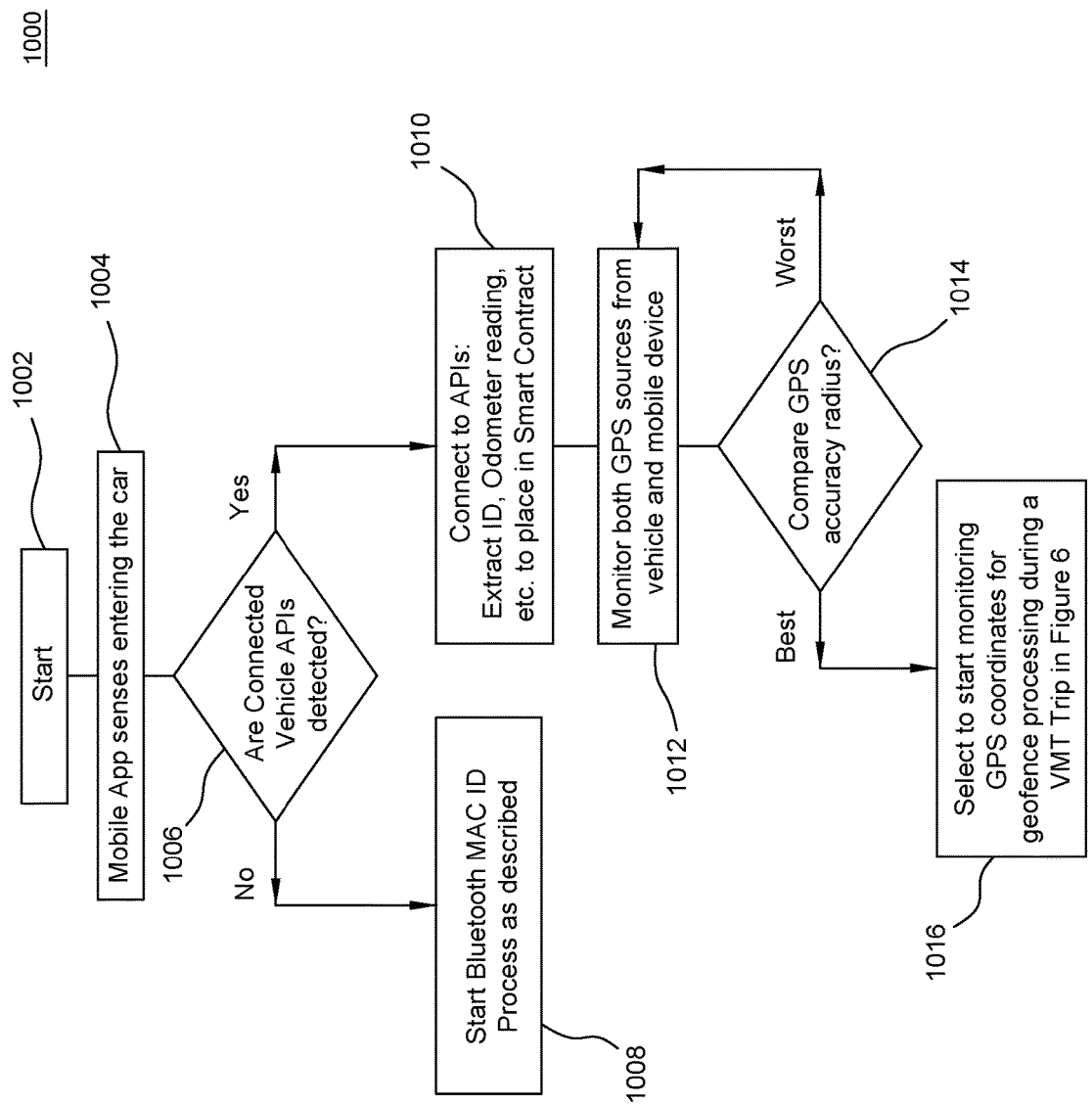
FIG. 10 shows a flowchart diagram of a method for initiating a VMT logging session, in accordance with some embodiments.

FIG. 10 shows a flowchart diagram for a method 1000 for initiating a VMT logging session, in accordance with some embodiments. Specifically, the method 1000 determine whether to use the mobile device's GPS receiver, or connect the vehicle's computer using an application program interface (API). In step 1002 the mobile device is turned on and operating. In step 1004 the mobile device automatically determines that it is in a vehicle. In step 1006 a determination is made whether the vehicle has an API. If not, then in step 1008 the mobile device tracks distance driven, location, time of day, speed, etc., as described. In step 1010, if the vehicle has an API available, such as over a WiFi link provided by the vehicle, then the mobile device can obtain odometer, speed, vehicle ID, and other relevant information from the vehicle directly. In step 1012 the mobile device can monitor both its own GPS receiver and that of the vehicle to determine whether there are errors in location as indicated in steps 1012, and 1014. If the vehicle's GPS accuracy radius is better than that of the mobile device, then the vehicle's GPS receiver output is used. In step 1016, monitoring using the vehicle's GPS receiver is used for method 600 (and 700/800/900).

Figure 11:
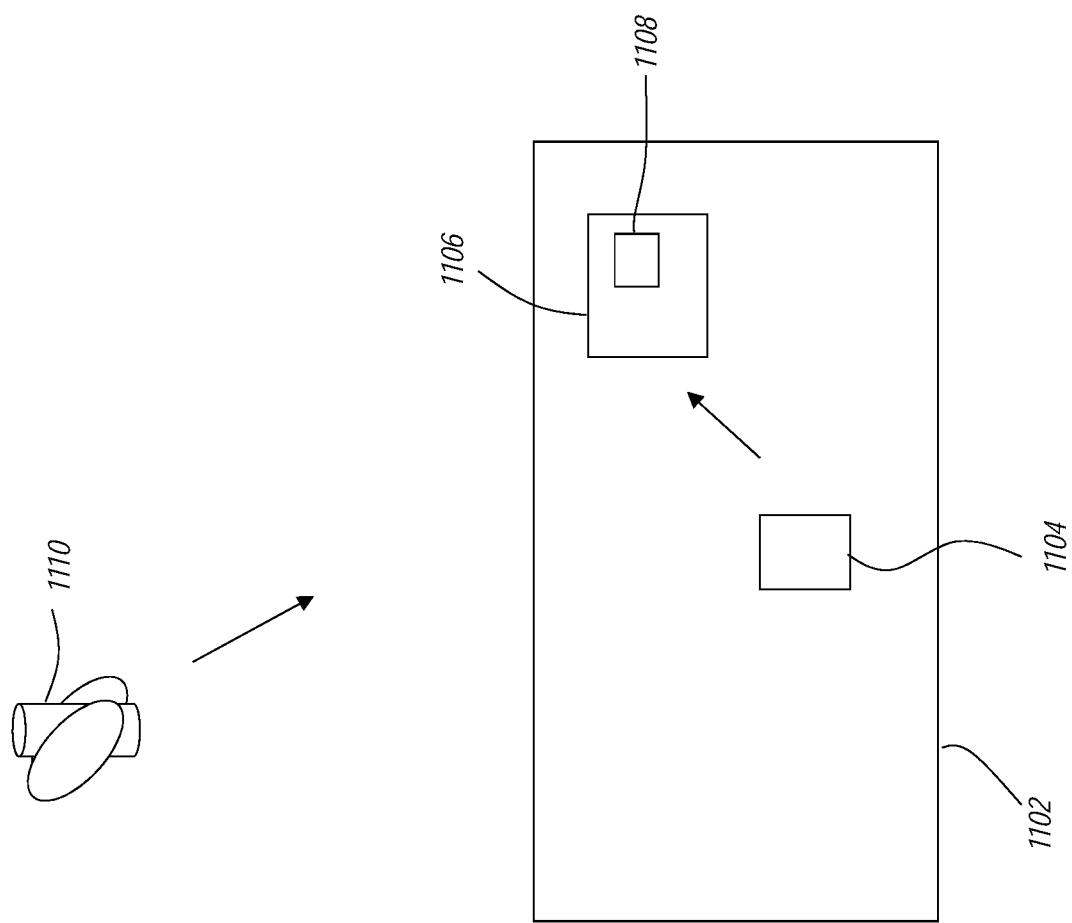
FIG. 11 shows a block schematic diagram of system including a mobile device and vehicle that use a blockchain VMT payment system.

FIG. 11 shows a block schematic diagram of system including a mobile device and vehicle that use a blockchain VMT payment system. A vehicle 1102 includes a vehicle system 1106 that can include a computer and an audio system. The vehicle system provides a wireless communication networking interface that allows a mobile device 1104 to wirelessly connect to the vehicle system 1106. The mobile device 1104 can be a conventional smartphone device that includes a cellular transceiver, and one or more local wireless networking transceivers, as well as a GPS receiver. The mobile device runs an application program that causes the processor and other hardware of the mobile device to take certain actions, and described hereinabove. The vehicle system 1106 also includes a GPS receiver 1108 that may or may not be more accurate than the GPS receiver of the mobile device 1104. Both the GPS receiver of the mobile device 1104 and the GPS receiver of the vehicle system 1108 receive signals from several GPS satellites 1110 that are in view overhead, and use those signals to determine the location of the GPS receiver on the Earth. Each of the GPS receivers can have a different accuracy, which can be determined by the GPS receiver by comparing successive location fix coordinates. Once the mobile device 1104 connects to the vehicle system 1104, if the vehicle system 1106 is in compliance with the "connected car" standard, which allows access to the vehicle data, then the mobile device can determine which GPS receiver is more accurate and use the more accurate GPS receiver for location information.

The mobile device 1104 can communicate with a cellular or mobile data infrastructure, such as a base station 1112, and through the cellular infrastructure, connect over the internet 1114 to a server 1116 that is coupled to a database 1118 in which geofence definitions 1120 are stored. The mobile device 1104 can therefore access the geofence definitions 1120 to determine which geofenced region the vehicle is presently located, as well as sub-divisions of a geofenced region. For example, the vehicle 1102 may be in a city geofence, which can be quite large. In addition, the vehicle can be within a geofence defined over a freeway with the city, and further, within a geofence defined over a high occupancy vehicle lane. Each one of these geofences can have a rate or rate modifier associated with them, and are all applied to a base rate, which can be further modified based on time of day, day of week, and other modifiers.

Generally, upon determining that the vehicle 1102 has started, the device responsible for collecting location data, whether it is, for example, the cellular telephone device 1104, or another in-vehicle device (e.g. the vehicle system), or another device added to the vehicle, such as one that plugs into the vehicle OBD port, the device determines its location and then contacts a server using the cellular mobile network. By reporting its initial location to the server, the server responds by providing geofence definitions 1120 corresponding the present location, and can also provide geofence definitions for nearby regions. The geofence definitions 1120 include the geographic boundaries of the geofence region in location coordinates, and various road usage charge information (e.g. base rate by vehicle type, and time of day modifiers, etc.) that allow the device in the vehicle to determine a charge. Alternatively, in some embodiments, the geofenced definitions 1120 are exclusively geographic boundaries, and device in the vehicle merely monitors and reports distance driven in the geofenced region.

Figure 12:
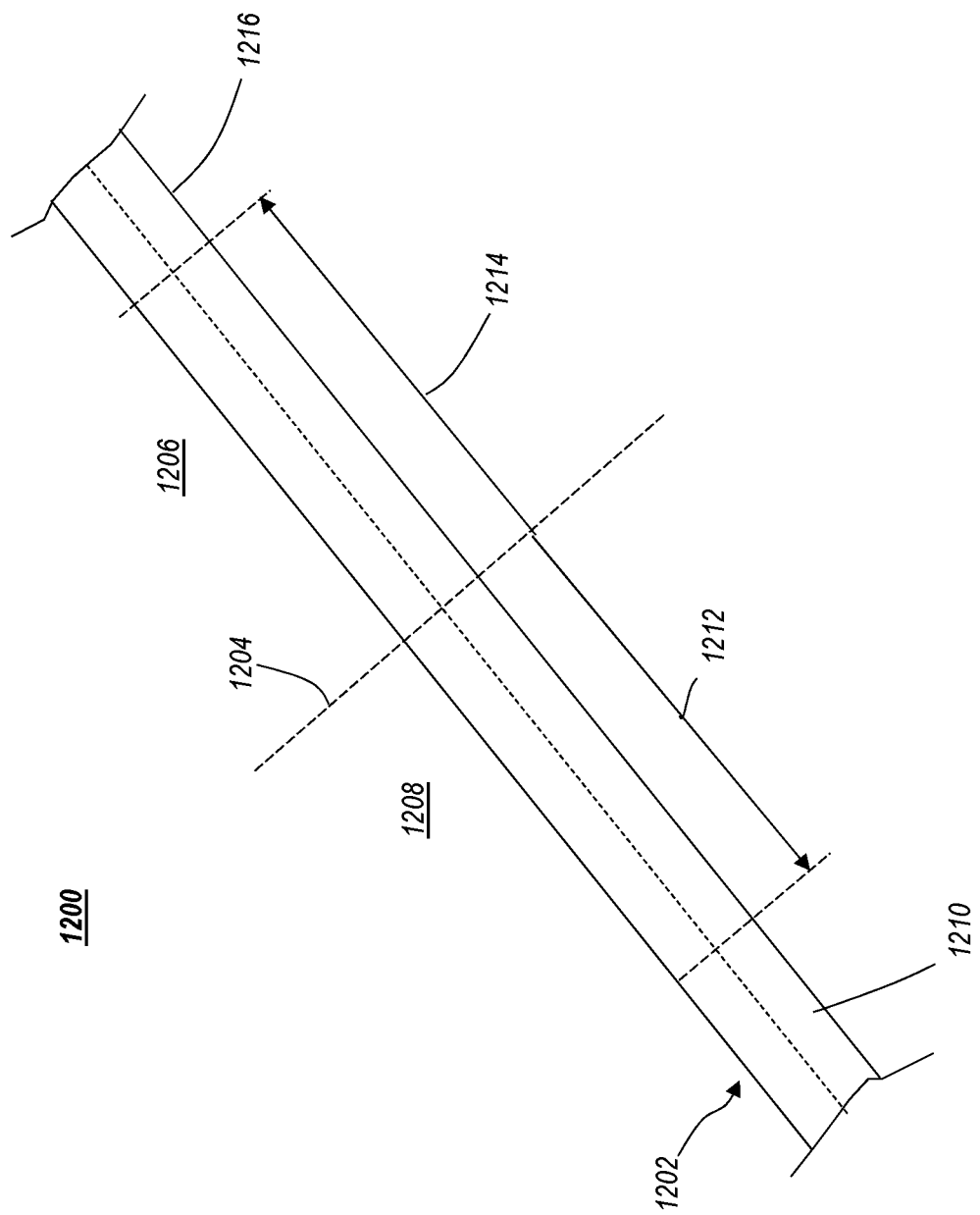
FIG. 12 shows a boundary between to geofenced regions having different VMT fee rates, in accordance with some embodiments.

FIG. 12 shows a boundary between to geofenced regions having different VMT fee rates, in accordance with some embodiments, in order to illustrate one way to improve the VMT payment system by reducing the amount of messaging required. In a given region 1200 there are two geofenced regions 1206, 1208 that meet at a boundary 1204. The two geofenced regions 1206, 1208 each have different VMT fee rates. The VMT fee rates can be range from a basic VMT fee rate to higher fee rates for toll roads, toll lanes, or simply different VMT fee jurisdictions (e.g. at state or county borders). A roadway 1202 traverses from one region 1206 to the other region 1208 across the boundary 1204. As vehicles drive on the roadway 1202, they will first be located away from the boundary 1204 by a distance that exceeds some threshold distance 1212, 1214. For example, vehicles in regions 1210, 1216 are farther away from the boundary 1204 than the respective threshold distances 1212, 1214. In these regions 1210, 1216, the mobile cellular device is performing location fix operations at a first rate. The mobile cellular device can report each location fix to the data center, and specifically to a server in the data center, using the cellular network and internet. This creates an auditable record of the distance driven by the vehicle. Alternatively, the mobile cellular device can report the distance driven since conducting a previous location fix, and in that way the server does not contain any location information to alleviate privacy concerns. In some embodiments the messages may be transmitted when the vehicle has travelled a given distance, rather than at regular time intervals. Thus, while the vehicle remains within a given geofenced region, and is not sufficiently close to a boundary with another geofenced region that uses a different VMT fee, the amount of messaging can be minimal in order to reduce the load on the servers in the data center back end.

However, when the vehicle is within the threshold distance 1212, 1214 from the boundary, the rate at which location fixes are performed is increased to a second rate in order to determine as accurately as possible if and when the vehicle crosses the boundary 1204. And as long as the vehicle remains within the threshold distance from the boundary 1204 the location fixes are performed at the second, higher rate. But once the vehicle is beyond the threshold distance from the boundary, the rate of performing location fixes can decrease again to the first rate. Thus, if a vehicle drives along road 1202 from region 1210 to region 1216, the rate of location fixes will change from the first rate to the second rate, and then back to the first rate. In addition to reducing the amount of signaling load on the back end servers, using the lower rate for location fixes also reduce battery drain in the mobile cellular device.

The geofenced regions 1206, 1208 are configurable. That is, an administrator can define them, and the metadata associated with them, include the VMT fee rate that is to be applied. This is also allow for the definition of nested geofenced regions. For example, a state can have a base VMT fee rate that applies to all driving on public roads in the state. Thus the entire state can be one geofenced region. Then sub-regions can be defined for counties, cities, tollroads, private roads (where VMT fee is void), high occupancy lanes, express lanes, and so on. This allows an administrator to redefine roadways in cases of detours for road construction, accidents, and other roadway obstacles of a temporary nature. The data center keeps track of distance driven in each of the various geofenced regions and sub-regions so that funds can be dispersed appropriately to the various jurisdictional entities. For example, a city may charge a congestion fee for vehicles within a given geofenced region in the city. Thus, a state authority can be due the basic VMT fees based on distance driven within the city congestion geofence, and the city is due a VMT fee for distance driven in the city congestion geofence. The data center separates out the various authorities that are to be paid in order to remit the appropriate funds to those entities for the vehicle.

Figure 13:
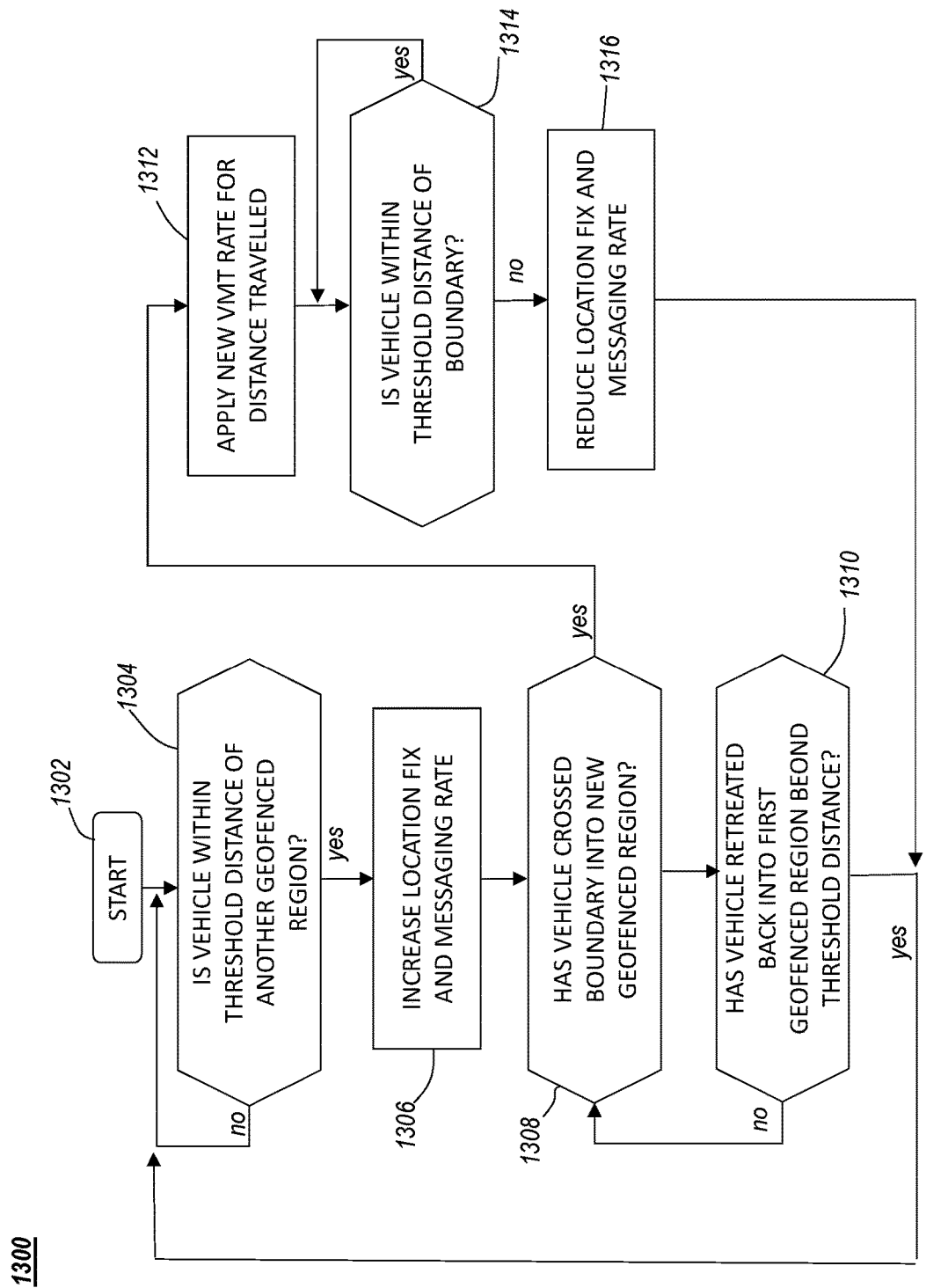
FIG. 13 shows a flow chart diagram of a method for reducing messaging to a back end server when driving among different geofenced regions having different VMT fee rates, in accordance with some embodiments.

FIG. 13 shows a flow chart diagram of a method 1300 for reducing messaging to a back end server when driving among different geofenced regions having different VMT fee rates, in accordance with some embodiments. At the start 1302 a vehicle contains a mobile cellular device that is running a background application program for determining distance driven, and the vehicle is in a first geofenced region that uses a first VMT fee rate. The mobile cellular device can determine that it is in the vehicle by, for example, obtaining the MAC address of the wireless interface to the vehicle audio system which is unique to that vehicle (meaning no other vehicle audio system will have the same MAC address). Initially assume that the vehicle is not with the threshold distance to any boundary, and is therefore performing location fixes at the first rate. Periodically the mobile cellular device can report the location or distance driven since the last report. This can be done each time a new location fix is performed or at some lesser rate of location fixes (e.g. reporting every other location fix).

In step 1304 the method determines if the vehicle is within the threshold distance to a boundary, and this step simply keeps iterating until the vehicle is approaching a boundary. Then in step 1306 the location fix rate is increased to the second rate. In steps 1308, 1310 the method determines if the vehicle has crossed a boundary, and if not, whether it is still within the threshold distance to the boundary in step 1310. If the vehicle does cross a boundary, then in step 1312 a new VMT fee rate is applied to the distance driven. The boundary can be the boundary between a non-toll road and a toll road, a jurisdictional boundary between different governmental jurisdictions, or any other boundary where the VMT fee rate can change. In step 1314 the method iterates until the vehicle is no longer within the threshold distance to the boundary, and when it is beyond the threshold distance from the boundary the location fix rate is decreased back to the first rate. During steps 1306-1314 the mobile cellular device is also messaging the back end server at a higher rate in order to determine as accurately as possible when the boundary is crossed. But when the vehicle is sufficiently away from the boundary, much less information is transmitted to the servers to reduce the load on the servers, which allows the operation of the servers to be performed with fewer servers and drawing less power by the back end office/data center.

Figure 14:
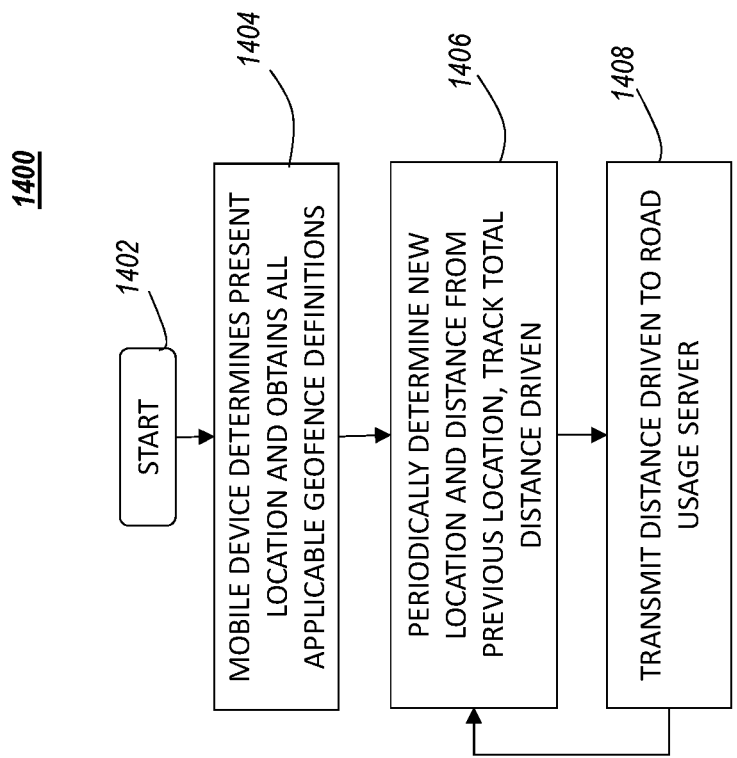
FIG. 14 shows a flow chart diagram of a method for reducing processing and resource load on a server back end in a road usage fee system, in accordance with some embodiments.

FIG. 14 shows a flow chart diagram of a method 1400 for reducing processing and resource load on a server back end in a road usage fee system, in accordance with some embodiments. At the start 1402, the mobile cellular device has determined that it is collocated in a vehicle, such as by being connected to the vehicle audio system and verifying the MAC address of a wireless interface of the vehicle audio system. In step 1404 the mobile cellular device uses its own GPS receiver resource to determine a present location of itself, and therefore a present location of the vehicle. The mobile cellular device then transmits the information to a geofence server which determines one or more geofence definitions that apply to the present location. The different geofence definition can each be provided as a separate data object to allow the mobile cellular device to periodically determine if the vehicle is about to leave a region corresponding to the geofence definition, as described hereinabove. In step 1406 the phone iteratively determines its location and tracks a total distance travelled by summing the distance between each location and the successively determined location. In step 1408 this distance information can be periodically transmitted to a road usage server that is responsible for billing the owner/operator of the vehicle for a road usage fee. Preferably no location information is ever transmitted to the server, or any other entity, to preserve the privacy of the owner/operator of the vehicle. The mobile cellular device can also determine the fee to the charged in a running total manner by applying the rate associated with each geofence definition to the distance travelled in that geofenced region.

Figure 15:
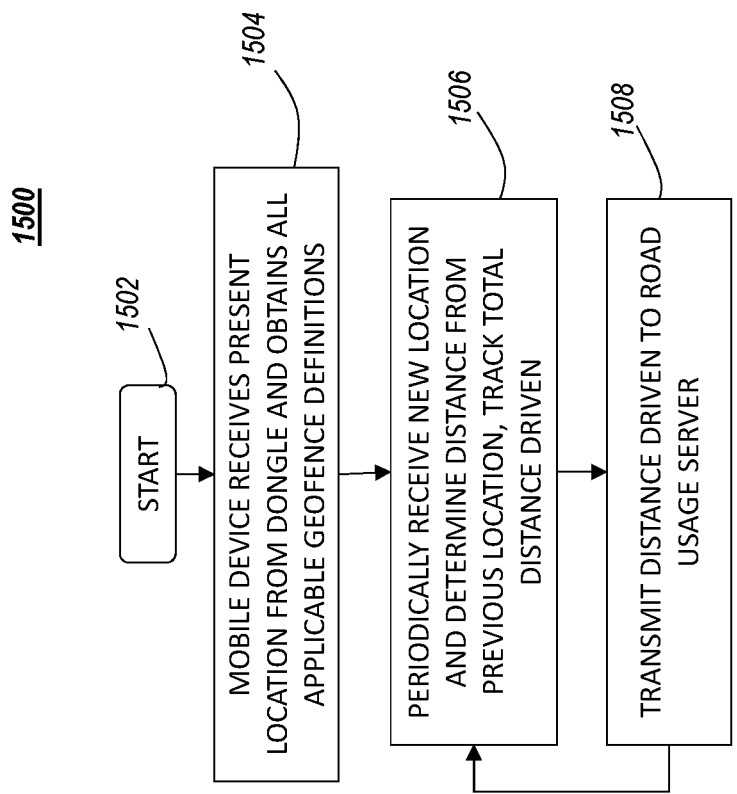
FIG. 15 shows a flow chart diagram of a method for reducing processing and resource load on a server back end in a road usage fee system in which a mobile cellar device operates as a server proxy in the vehicle for a dongle connected to the vehicle, in accordance with some embodiments.

FIG. 15 shows a flow chart diagram of a method 1500 for reducing processing and resource load on a server back end in a road usage fee system in which a mobile cellar device operates as a server proxy in the vehicle for a dongle connected to the vehicle, in accordance with some embodiments. At the start 1502, the mobile cellular device has determined that it is collocated in a vehicle, such as by being connected to the vehicle audio system and verifying the MAC address of a wireless interface of the vehicle audio system. Further, the mobile cellular device also connects to a dongle device that is connected to the vehicle system. The dongle device includes a location receiver and is capable of determining its location. Ordinarily the dongle device would simply transmit location data to a server in a data center using a cellular network, for example. However, transmitting location information to the server (e.g. in a server farm or data center), will, collectively when many such devices are transmitting location information, require substantial server and other computing resources to process. Instead, to reduce the amount of resources needed at the data center, in step 1504 the mobile cellular device connects to the dongle using a local wireless interface, and operates as a server proxy, receiving location information from the dongle device. Upon getting an initial location reading, the mobile cellular device transmits the location to a server and receives one or more geofence definitions that are applicable to the present location. The mobile cellular device, in step 1506, continues to receive location information from the dongle, and tracks a distance travelled. In step 1508 the mobile cellular device can periodically transmit the distance travelled and a charge amount to be applied based on distance travelled in each geofenced region. Preferably, only a minimal amount of location information is transmitted to the server in order to obtain the initial or updated geofence definitions.

Figure 16:
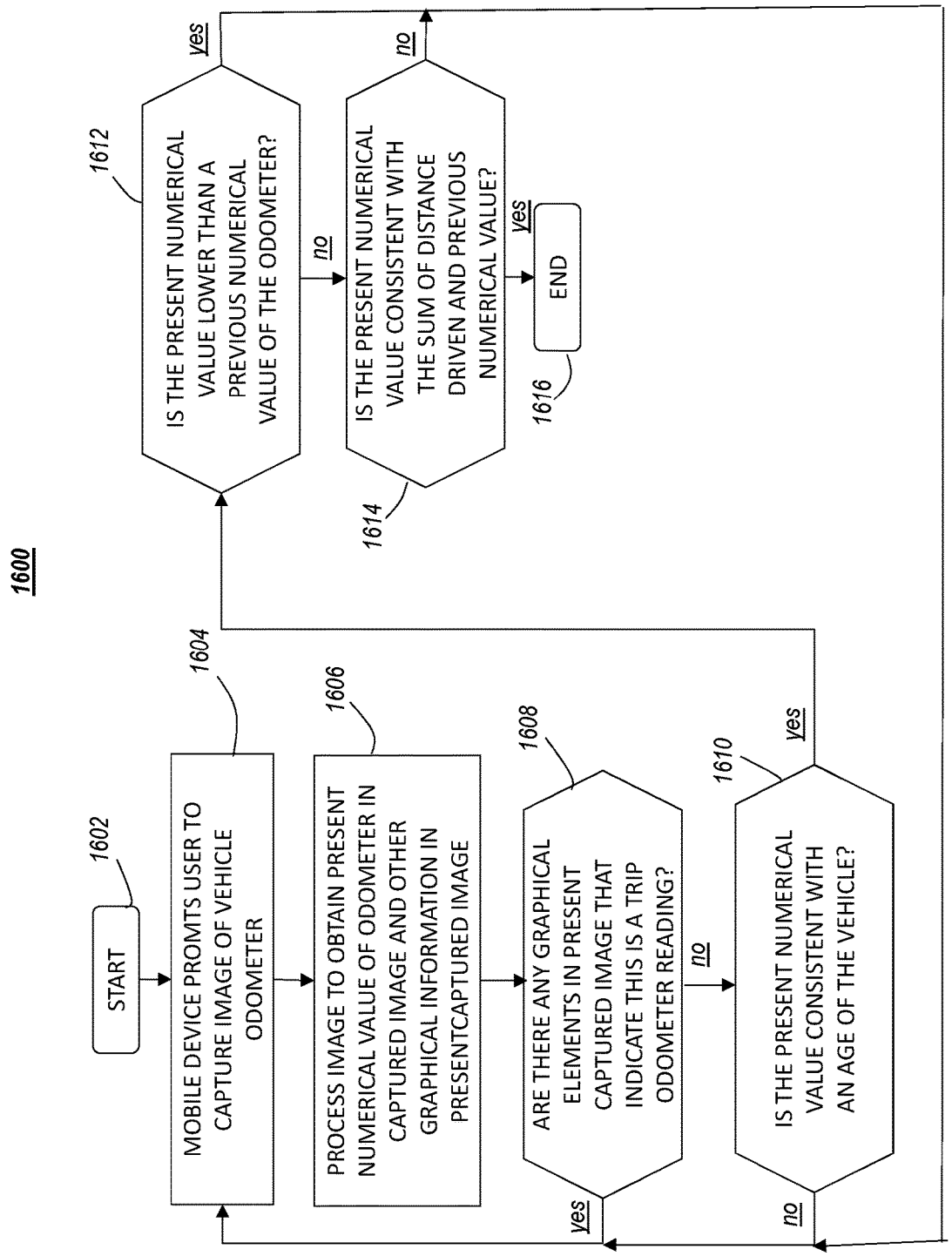
FIG. 16 shows a flow chart diagram of a method for determining whether an odometer reading is a total distance driven reading or a trip distance driven reading for the vehicle, for use in verifying the distance driven in a road usage fee system.

FIG. 16 shows a flow chart diagram of a method 1600 for determining whether an odometer reading is a total distance driven reading or a trip distance driven reading for the vehicle, for use in verifying the distance driven in a road usage fee system. Most vehicles today track the total distance driven on the odometer, but also allow the user to track trip distances. Trip odometer readings are resettable to zero, to start measuring distance again. There are typically two trip readings called "Trip A" and "Trip B." Since these are a subset of the total distance driven, they can never be more than the total distance driven. It is contemplated that when the user is prompted to capture an image of the vehicle odometer, they may inadvertently have a trip odometer reading in view instead of the total vehicle distance reading. Thus at the start 1602 the user has started the application program and the mobile cellular device has some indication that it is in a vehicle. At step 1604 the user is prompted to capture an image of the vehicle odometer. That is, the mobile cellular device, running the road usage charge application, prompts the user to use a camera of the mobile cellular device to take a picture of the odometer. At step 1606 the mobile cellular device then processes the image to recognize and obtain a numerical value of the odometer, and other graphical elements that may be in view. In steps 1608-1614 the mobile cellular device undertakes one or more, or all, of several steps to determine if the numerical value is for a trip reading or a total distance driven reading. In step 1608, if there are any graphical indications that the value in view is a trip value, the method can alert the user of such as return to step 1604. For example, if the word "TRIP" or the letters "A" or "B" are shown, then that can mean it is a trip reading in view. In step 1610 the present numerical value obtained from the image is compared with an age of the vehicle. If the distance driven appears to be substantially less than expected, then the method can decide that the image captured was of a trip reading. In step 1612 if the present value is lower than a previously captured value, then it is likely a trip reading. And in step 1614, if the present value is different than the sum of a previous odometer reading and a distance traveled since the previous reading was taken, as determined by the mobile cellular device, then it can assume to be a trip reading and return to step 1604.

Figure 17:
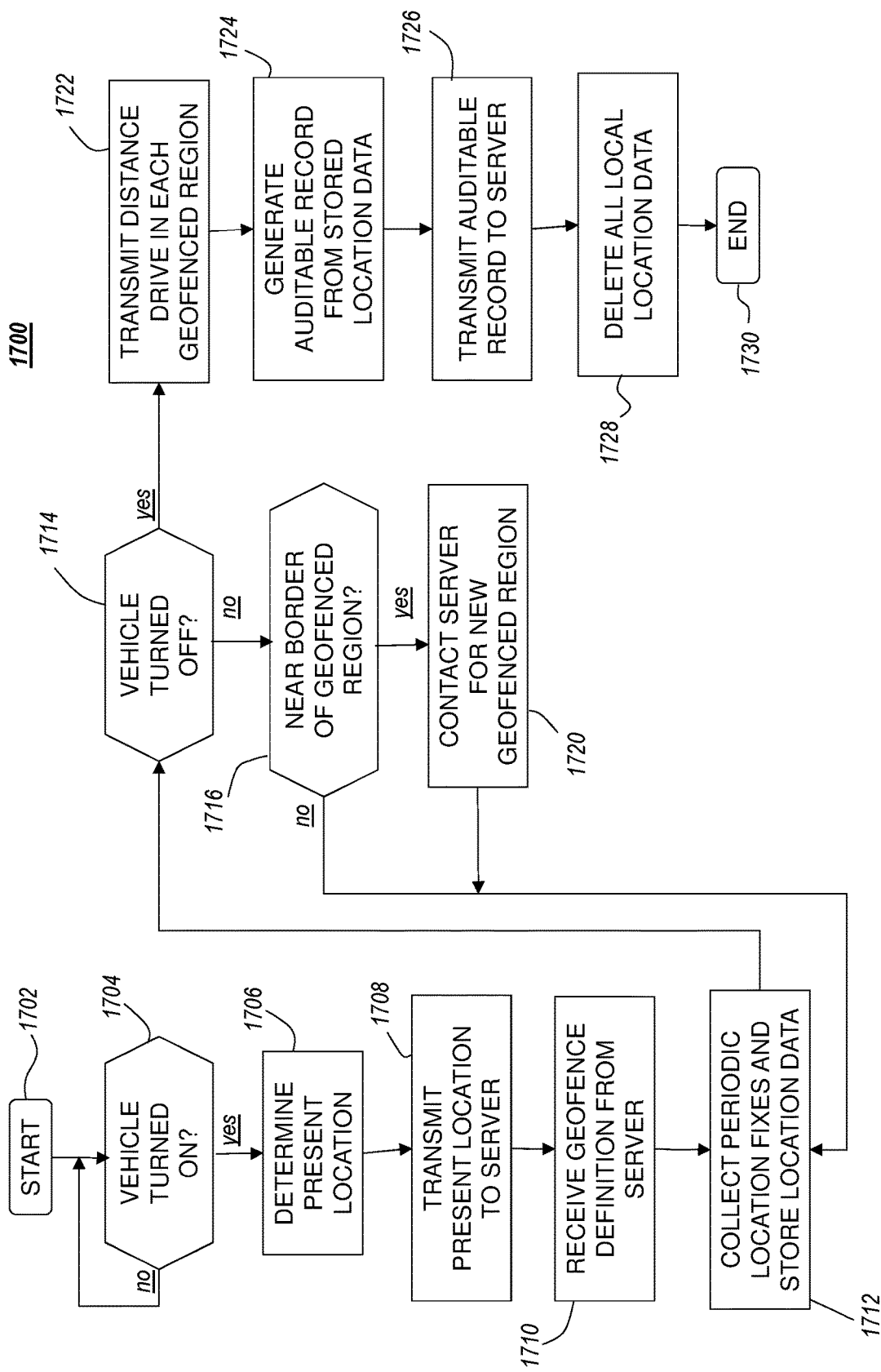
FIG. 17 is a flow chart diagram of a method for reporting distance driven and creating and reporting an auditable record of where a vehicle has travelled, in accordance with some embodiments.

FIG. 17 is a flow chart diagram of a method 1700 for reporting distance driven and creating and reporting an auditable record of where a vehicle has travelled, in accordance with some embodiments. At the start 1702 a device can be provided in the vehicle that is capable of wirelessly communicating with other equipment. The device can be a cellular telephone (smartphone) device, or a device that fits into the vehicle on-board diagnostic (OBD) port to communicate with the vehicle computer, or an equivalent device. In general, the device must be able to communicate with at least a system of the vehicle that allows for uniquely identifying the vehicle, a satellite location receiver, and a radio transceiver for communicating wirelessly with other equipment that is remote to the vehicle, or to another device in the vehicle that can communicate with remote equipment. In step 1704 the device detects that the vehicle has started up. This can be performed in several ways, including, for example, if the device is a cellular telephone device, connecting to the vehicle audio system via a PAN link (e.g. BLUETOOTH). Once the vehicle is turned on, the vehicle audio system will automatically detect and connect with any devices that have been set up to connect with the vehicle audio system. The term "connect" in this context means to establish a wireless link according to the air interface of the applicable radio protocol. Typically the device and the vehicle audio system will handshake to confirm that they are each present and able to communicate, when not otherwise transmitting information between the two systems. As is well known, it is common for wireless devices to establish such links and maintain the connection. If the device is plugged into the vehicle ODB port, then the device can determine that the vehicle has been turned on through the vehicle computer.

In addition to detecting that the vehicle has turned on, the device must identify the vehicle. Every vehicle has a unique vehicle identification number (VIN) but the network interface transceiver of the vehicle audio system also uses a unique media access control (MAC) address, which is transmitted to other devices upon connecting. Thus, a cellular telephone device connecting with the vehicle audio system will receive the MAC address of the vehicle audio system transceiver, and be able to cross reference it with the VIN that can be entered by the user upon setting up the phone application program. A device that is plugged into the vehicle OBD port can get the VIN directly from the vehicle computer and relay that information to the user's cellular telephone device that can be interfaced to the device and in communication with the backend server.

In step 1706, immediately after detecting that the vehicle has been turned on and identified, the present location of the vehicle is determined. This step is performed by, for example, receiving satellite positioning signals at a suitable receiver and processing those signals, as is well known, to determine the location and time. Either the user's cellular telephone device or, if there is a device connected to the vehicle OBD port, then that device can perform the location fix. In step 1708 the present location is then transmitted to the backend server (e.g. 1116) with a request for the appropriate geofence definition. The geofence definitions define a geographic region for the purpose of determining a road usage charge. These geofence definitions can be used in addition to other geofence definitions that can be more specific to particular roadways, for example, to identify toll and non-toll lanes of a roadway, or other detailed geofences that can relate to other forms of charges (e.g. tolls) in addition to the road usage or VMT charge. In determining the road usage charge, for example, it is not necessary to map to a particular roadway, rather the total distance driven is determined. Other geofence definitions can be used to reduce the road usage charge if the vehicle was driven on private land/roads but the present method 1700 facilitates the determination of a base road usage charge.

In step 1710 the appropriate geofence definition is received at the user's cellular telephone device. The geofence definition includes a coordinate constellation that forms a boundary corresponding to a geographic region. In addition, the geofence definition an include metadata, such as a unique identifier, version number, and other relevant information. At about the same time the device begins periodically performing location fixes and the location information is stored locally in step 1712, either in the cellular telephone or in the ODB device if that device is performing the location fixes. Alternatively all location fixes can be transmitted by the ODB device to the cellular telephone device. In either case, the location fixes are not transmitted to any remote equipment (e.g. the backend server). The location fixes can be performed about every ten seconds in some embodiments. In some embodiments location fixes can be performed based on distance moved, wherein the frequency in time of performing location fixes can vary with the average speed of the vehicle. In practice, the satellite positioning receiver can be activated to continuously output location coordinates, and the output at periodic intervals can be sampled as location fix for method 1700. In some embodiments location information before and after a given sampling time can be averaged to reduce the effects of dithering in the satellite signal and obtain a more accurate location. Each new location fix becomes the present or most recent location. The distance between each successive location fax can be determined and accumulated as a distance driven.

One the location fix operation has begun method 1700 enters a loop in which steps 1714 and 1716 can be repeated. In step 1714 the method 1700 determines whether the vehicle has been turned off. That will be indicated, for example, if the cellular telephone loses contact with the vehicle audio system, or, at the ODB device, the vehicle being turned off can be determined directly from the vehicle computer. While the vehicle remains operating, in step 1716 the most recent location fix is compared to the borders of the presently geofence definition to determine whether the vehicle appears to be on the way out of the region covered by the present geofence definition. For example, if the vehicle is heading in a direction of the border of the geofence definition and within a threshold distance, then it can be assumed that the vehicle will be entering an adjacent geofenced region with its own geofence definition. If the vehicle is still operational and not approaching a border of the geofenced region, then the method returns to step 1712 to collect additional location fixes. It should be understood that while indicated as a series of steps, the various steps of method 1700 can be performed by parallel software processes. For example, one process can simply collect location fix data while another process monitors the state of the vehicle, and yet another process independently compares the most recent location fix coordinates with the border of the geofenced region as indicated in the geofence definition. If the vehicle is turned off then the process monitoring the state of the vehicle can interrupt other processes. Likewise, while method 1700 operates for road usage charge purposes, other processes can operate for tolling purposes, using narrow geofence definitions that are defined over specific roadways, for example.

In step 1716, if the location data indicates that the vehicle is approaching the boundary of the geofenced region being used for road usage charge determination, then in step 1720 the user's cellular telephone device can request a geofence definition for the adjacent region. The backend server will transmit one or more geofence definitions in response that can be used by the user's device. In addition, when the vehicle actually leaves a geofenced region described by a geofence definition, the user's device can determine a total distance travelled in the geofenced region. In step 1714, if the vehicle is shut off, then the method 1700 proceeds to the step 1722 in which the user's device (e.g. cellular telephone device) will transmit the distance driven in each geofenced region to the backend server for road usage charge determination. This avoids transmitting every location fix to the backend server, which reduced the processing and storage load requirements of the backend server. Considering that there could be millions, or tens of millions of drivers whose devices could be reporting location data every ~10 seconds or so, receiving the distance driven instead is an enormous savings in the amount of processing that the backend server must undertake, as well as a relief of network congestion that would occur. While, generally, location data is not reported to the backend server, and eventually deleted from the device(s) in the vehicle, there needs to be an auditable record of where the vehicle has driven. Thus, a subset of all of the location fix data is selected for the audit record in step 1724. In other words, selecting every nth location fix, where n is an integer between 5 and 100. In some embodiments every $10^{th}$ location fix can be used for the audit record. In some embodiments every $20^{th}$ location fix may be used for the audit record. Other criteria for selecting particular ones out of all of the location fixes for the auditable record can be developed as well. For example, where the heading of the vehicle substantially changed, such as upon turning a corner, then a location fix obtained at that point can be included in the subset of location fixes. This subset of the location fixes is reported in step 1726 as the audit record to the backend server, where it is stored for a period of time in case there is any question as to where the vehicle had been driven and to prove up the road use charge. In step 1728 all local location data (at the user's cellular telephone device) is deleted, and then the method ends 1730. Thus, method 1700 reduces network congestion, reduces the processing load on the server, and reduces the storage space requirements to maintain auditable records over a system where the device at the vehicle simply reports all location data to the backend server.

The number of geofence definitions transmitted to the user device can vary based on the location of the vehicle. For example, if the vehicle is heading into a region with poor or no cellular coverage, then then either the geofence definition can cover a very large region such that the borders are selected to be places where there is known to be coverage so that the user device can communicate with the backend server. If the user device is unable to communicate with the backend server when either the vehicle is turned on or off, the a prior trip can be continued. If there is a difference in the location upon the vehicle starting up, relative to the location when the vehicle was last turned off, then the difference between those locations can be assumed to be distance travelled.

Figure 18:
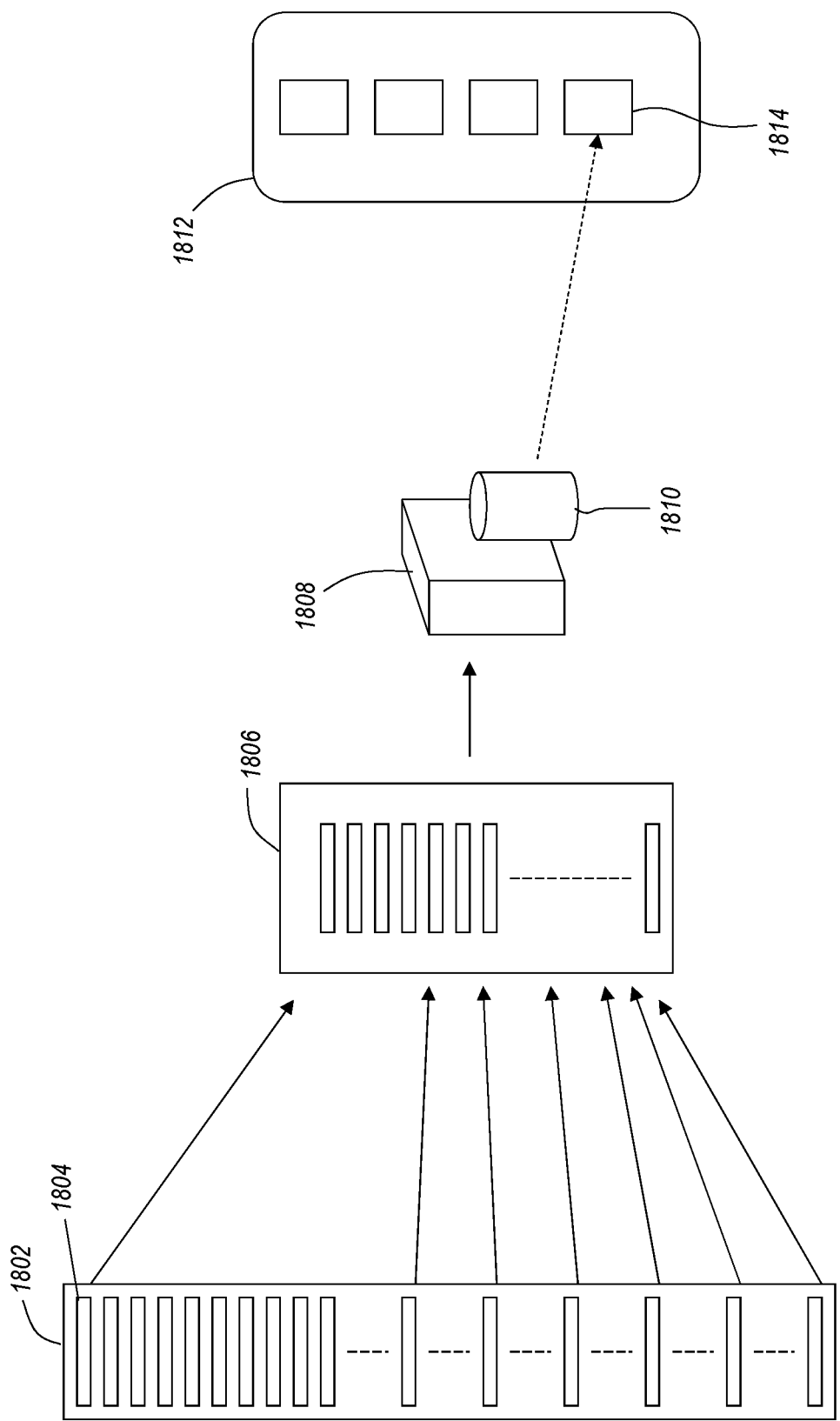
FIG. 18 shows a process of recording periodic location fixes at a device in a vehicle, and selecting a subset of the location fixes for an auditable record that is transmitted to the backend server.

FIG. 18 shows a process of recording periodic location fixes at a device in a vehicle, and selecting a subset of the location fixes for an auditable record that is transmitted to the backend server. The local memory 1802 of the user's device contains a plurality of location fix data 1804. Each location fix includes geographic coordinates, and can include metadata such as time/date, as well as speed of the vehicle, acceleration, and heading direction at the time the location fix was acquired. The metadata can also include the VIN, and even information about the vehicle such as fuel usage and/or vehicle diagnostic information. Selected ones of all of the location fixes 1804 are used to generate the auditable record 1806, as indicated by the arrows. The auditable record 1806 can be transmitted to the backend server 1808 for storage in a database 1310 or on a distributed ledger 1812 as a block 1814 in a blockchain. The auditable record 1806 is used in the event that the owner of the vehicle wishes to confirm or challenge a road use charge fee.

Figure 19:
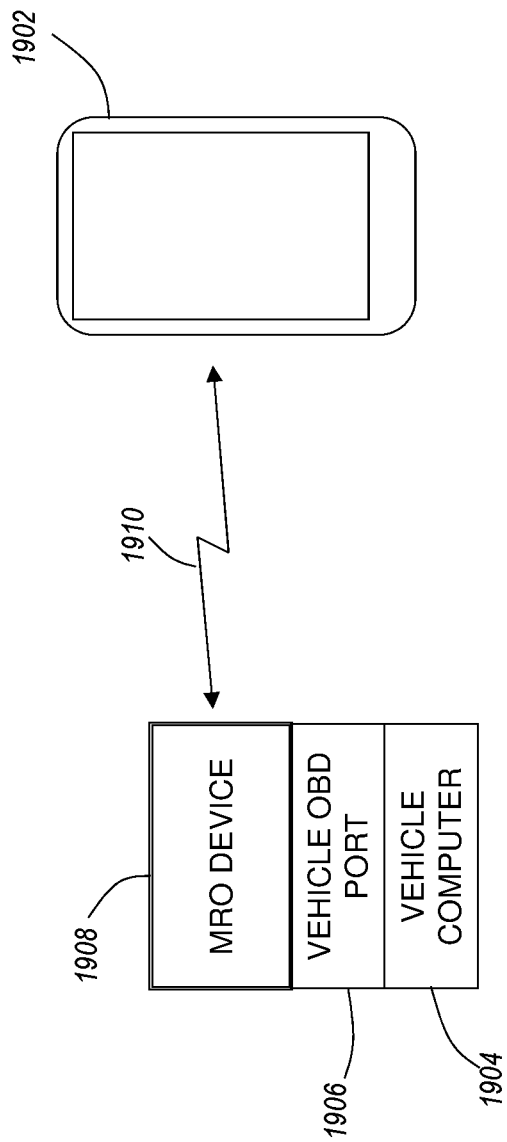
FIG. 19 show the use of an MRO device in a vehicle, where the MRO device is linked to a cellular telephone device, and where the MRO device performs location fixes and transmits location information to the cellular telephone device.

FIG. 19 show the use of an MRO device 1908 in a vehicle, where the MRO device 1908 is linked to a cellular telephone device 1902, and where the MRO device 1908 performs or obtains location fixes and transmits location information to the cellular telephone device 1902. The vehicle has a vehicle computer 1904 that can be accessed through the on board diagnostic (OBD) port 1906. The OBD port 1906 is used to obtain information about the vehicle and the various vehicle systems which can allow technicians to diagnose problems with the vehicle. The MRO device 1908 is a device that includes a physical connector portion that fits into the OBD port 1906, and has conductors that mate with at least some of the conductors in the OBD port connector to interface with the vehicle computer 1904. In addition, the MRO device can include a satellite positioning receiver and a PAN transceiver for communicating with the cellular telephone device 1902 using, for example, a PAN radio link 1910. Alternatively, if the vehicle includes a satellite positioning receiver, the MRO device can access location data from the vehicle's satellite positioning receiver. Use of the MRO device allows for more assurance in detecting the vehicle being turned on and off. Also, since it isn't used for anything else, it can stay in the vehicle at all times, unlike the cellular telephone device 1902. In the arrangement shown here, the cellular telephone device 1902 connects to the MRO device 1908 upon the vehicle being turned on, which will provide power to the MRO device through the OBD port 1906. The MRO device 1908 can then commence obtaining location fix data and providing it to the cellular telephone device 1902. The cellular telephone device 1902 will be operating an application program that is designed to perform portions of method 1700, including communicating with the backend service, storing location data, comparing present location with the boundaries of the geofence definition, and so on. The location fix operations can be relegated to the MRO device 1908. Cooperatively, then, the cellular telephone device 1902 and the MRO device 1908 perform method 1700.

Figure 20:
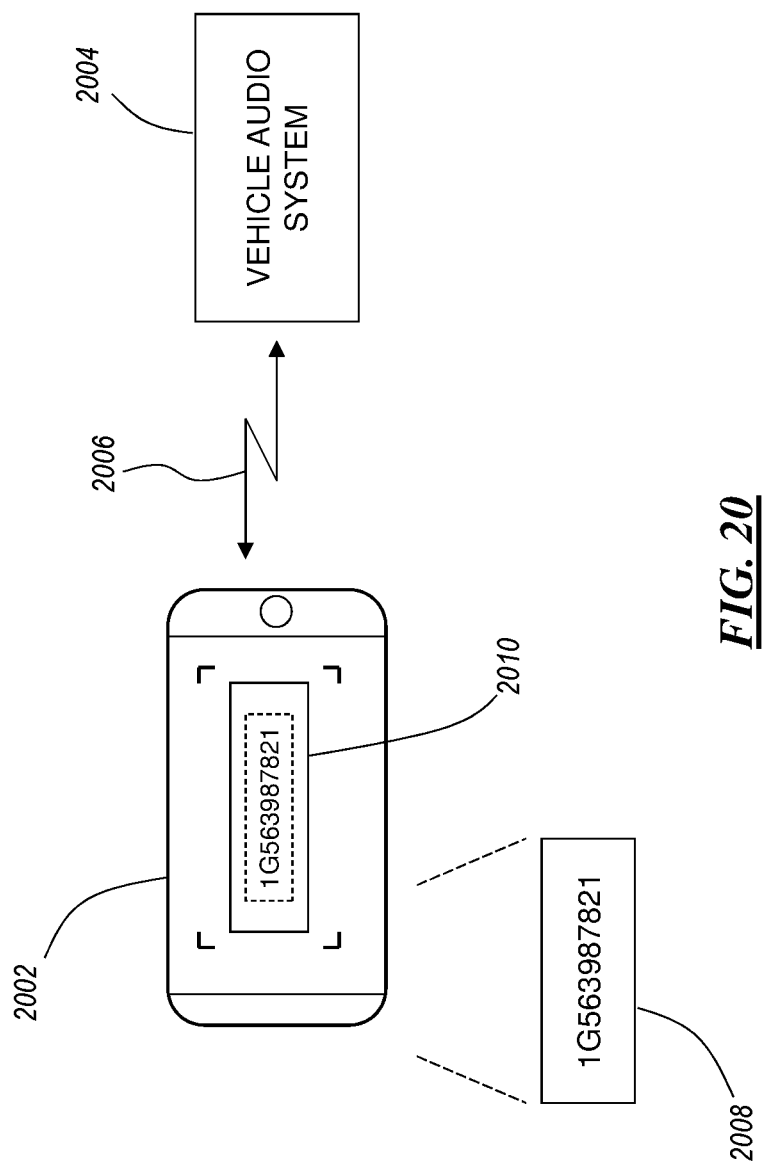
FIG. 20 shows a set up process for associating the VIN of a vehicle with the MAC address of the vehicle's audio system so that the VIN can be reported for road usage charge purposes.

FIG. 20 shows a set up process for associating the VIN of a vehicle with the MAC address of the vehicle's audio system so that the VIN can be reported for road usage charge purposes. In order to set up the user's cellular telephone device 2002 to authenticate and report distance travelled in association with the vehicle's VIN, using the application program the cellular telephone device 2002 is first connected with the vehicle audio system 2004 using a personal area network wireless link 2006. The application program will first ensure that the connection 2006 exists, and will record the MAC address of the vehicle audio system's network interface transceiver. Since the MAC address is unique and hard coded into the transceiver, and because the link 2006 is a very short range link, any time the cellular telephone device 2002 is able to connect to the vehicle audio system 2004 it is reasonable certain that the cellular telephone device is in proximity of the vehicle. The link can be, for example, a pairing made using the protocol known by the tradename BLUETOOTH, which is an automatic connection when the both the cellular device 2002 and vehicle audio system 2004 are powered on and in sufficiently close proximity, assuming they have previously been paired. While connected to the vehicle audio system, the user selected an interface option to record the VIN, and a photo interface will be provided by the application program. The user then centers the VIN 2008 in the view of the camera of the cellular telephone device 2002 such that the an image of the VIN 2010 appears in a designated area in the view screen. While this is occurring, and optical character recognition program is evaluating the image 2010 to recognize the VIN characters. The VIN can be found in several places in the vehicle (door label, windshield marker, etc.), and prior to opening the photo interface the application program can provide directions to the user and prompt the user to confirm that the user has found the VIN. Once the cellular telephone device has recognized the VIN, the VIN can be checked against the manufacturer and model of the vehicle to ensure the VIN recognized through the photo interface is appropriate. This can be done, for example, by checking an automotive database that indicates VIN format and ranges for various manufacturers and vehicle model years. Once the VIN has been recognized and verified, then the VIN can be stored in the cellular telephone device in association with the MAC address of the vehicle audio system. Subsequently, every time the cellular telephone device connects to the vehicle audio system, the MAC address will allow the cellular telephone device to report the VIN to the backend server for road usage charge purposes. Once the VIN has been associated with the MAC address of the vehicle audio system, then method 1700 can be carried out using the cellular telephone device 2002. In embodiments where a device is connected to the OBD port, the device will have direct electronic access to the VIN, so no preliminary association is required in those embodiments.

The disclosed embodiments provide several other important benefits over other proposals for "black box" type devices that connect to the vehicle ODB port, for example. One advantage is that by using the mobile cellular device, the ODB port is free to be used for other functions unrelated to VMT fee assessment. However, a ODB dongle device can be used in older vehicles that lack an audio or other vehicle wireless interface. The ODB device can connect to the mobile cellular device using a personal area networking protocol, such as BlueTooth, and information accessibly via the ODB port can be used to confirm that the mobile cellular device is in the vehicle. Another advantage is that, since the operation is performed by a background application program in the mobile cellular device, there is no dongle device that people could attempt to tamper with. The mobile cellular phone device can force a user to report odometer images in order to ensure that all distance drive reconciles with what has been reported, which obviates situations such as leave the mobile cellular device at home, or otherwise not bringing it in the vehicle. Of course the odometer image can be taken only when the mobile cellular device can detect the wireless interface to the vehicle audio system to ensure the odometer picture is accurate. The user will not have an opportunity to edit or tamper with the image as it is automatically sent upon being captured, after performing an optical character recognition process to ensure the digits of the odometer can be seen. Another advantage is that there is no concern over the dongle memory being corrupted or damaged since all the location information, or at least distance driven, is reported to the server. Thus, if the mobile cellular device becomes defective, the same background application program can be installed on new device and opened to an existing account without loss of distance driven information. Another advantage is that the same mobile cellular device can be used with multiple vehicles to separately report the distance driven for each one. The mobile cellular device can identify each vehicle by connecting to the vehicle's local wireless interface. In addition to prompting the user to capture a picture of the odometer, the user can be prompted to capture a picture of the vehicle identifier number badge, showing the VIN, to ensure that the vehicle is the correct vehicle. The use of geofenced regions with boundaries allows the combination of various types of roadways having different VMT fee rates, and different jurisdictions having different fee rates.

The disclosed invention provides numerous benefits over other proposals for VMT. In particular, the technological solution used protects the driver's privacy. Rather than, for example, a tracking system that allows a third party to know where a vehicle has been driven, only the distance driven, and the applicable fee modifiers are known, if even that is made available to the VMT agency. Rather, the user's equipment, possibly in conjunction with a third party back-end or data center, verifies the distance driven and the fee modifiers that apply and put this information into a block to be verified. Where the user has travelled is not recorded. The user can make this an option on their own equipment to verify that the equipment is accurately calculating the distance travelled and the fee modifiers that may apply, but it need not be made available to anyone else.

The disclosed invention also provides the benefit of eliminating the need for reconciliation. Reconciliation occurs when a vehicle passes a toll point but is not initially identified by the RFID toll tag, and a license plate image must be used. Often this requires manual review, despite advances in image and optical character recognition technology. As a result, it can take weeks to identify a vehicle, issue an invoice, and then receive payment. While this is an ongoing problem with toll roadways, the effect would be massively multiplied such systems were expanded to cover all roads for VMT fees. By keeping the distance travelled in a block associated with vehicle, the payment due is readily determined, avoiding the need for reconciliation.

Another benefit of the invention is unique dynamic pricing algorithm in which the incidence of vehicles entering geofenced regions can be used to determine congestion, and associated fee modifiers. Further, the system can identify congested areas and make others aware of these areas so that alternative routes can be taken to avoid the congestion and the increased congestion fee modifier. Thus, the system provides for dynamic real time pricing in response to congestion.

Still another benefit of the invention is the unique feature of the system to be able to choose the most accurate GPS data, either from the mobile device or the connected/autonomous vehicle, in cases where both are available. By monitoring telematics data from the connected vehicle API the application on a mobile device, for example, can determine which of the two local systems produces the smallest radius of error in GPS location fixes. Selecting the more accurate GPS system reduces errors in identifying when a vehicle is within or outside of a given geofence region, as shown in FIG. 11. Furthermore, having the ability to select from two different GPS sources provide concurrent redundancy that resolves specific GPS precision challenges arising from poor satellite coverage, jamming, spoofing, underpass obstructions, faulty equipment, different GPS modules or platforms accuracy, etc.

What is claimed is:

1. A method for determining distance driven in a vehicle for road usage charge, comprising:
   at a device in a vehicle, detecting that the vehicle has been turned on;
   responsive to detecting that the vehicle has been turned on, the device determining a present location of the vehicle;
   responsive to determining the present location of the vehicle, transmitting the present location to a backend server;
   receiving from the server a geofence definition for a region including the present location;
   responsive to receiving the geofence definition, commencing periodically and repeatedly determining a new location fix including a location and time and storing each new location fix, wherein each new location is stored locally in the device only, and not transmitted to any remote equipment, while the vehicle is turned on;
   while periodically and repeatedly determining each new location the device comparing each new location to the geofence definition;
   the device determining that the vehicle has been turned off;
   responsive to the device determining that the vehicle has been turned off, the device determining a distance driven in the geofence definition and transmitting the distance driven and a geofence definition identifier to the backend server; and
   the device creating an auditable record by selecting a subset of the location fixes that are the only location fixes included in the auditable record and transmitting the auditable record to the backend server, and no other location information is transmitted to the backend server.

2. The method of claim 1, wherein detecting that the vehicle has been turned on comprises the device connecting to an audio system of the vehicle using a wireless personal area network link.

3. The method of claim 1, wherein detecting that the vehicle has been turned on comprises power being provided at an on-board diagnostic (OBD) port to which the device is coupled.

4. The method of claim 3, wherein determining the present location of the vehicle is performed by the device coupled to the OBD port, and transmitting the present location is performed by the device coupled to the OBD port first transmitting the present location to a cellular telephone device that is wirelessly coupled to the device coupled to the OBD port, and the cellular telephone device transmitting the present location to the backend server.

5. The method of claim 1, wherein creating the auditable record comprises selecting every nth location fix, where n is an integer between 5 and 100.

6. The method of claim 1, wherein creating the auditable record comprises selecting location fixes that are not more than a selected distance apart from one selected location fix to the next selected location fix.

7. The method of claim 1, further comprising, subsequent to transmitting the auditable record to the backend server, the backend server creating a block in a blockchain that includes the auditable record.

8. The method of claim 1, further comprising:
   responsive to comparing each new location to the geofence definition, determining that the vehicle is approaching a boundary of the geofenced definition;
   responsive to determining that the vehicle is approaching the boundary of the geofenced definition, the device requesting and receiving from the backend server a new geofenced definition for a region adjacent to the region of the geofenced definition; and using the new geofenced definition upon the vehicle entering the adjacent region.

9. A method for determining distance driven in a vehicle for a road usage charge, comprising:
receiving, at a device associated with the vehicle, each time the vehicle is turned on, a plurality of geofenced definitions from a backend server, each geofenced definition of the plurality of geofenced definitions corresponding to a unique geographic region of a respective plurality of contiguous geographic regions;
periodically performing a location fix that indicates a present location of the vehicle;
storing a result of each location fix at the device only, and not transmitting any of the location fixes to any remote equipment, to produce a plurality of stored location fixes;
comparing each location fix to a present one of the plurality of geofenced definitions;
when the location fix indicates that the vehicle has travelled into a new geofenced region, the device transmitting a distance driven in the geofenced definition to the backend server; and
determining that the vehicle has been turned off, and in response selecting a subset of location fixes of the plurality of stored location fixes to create an auditable record indicating where the vehicle has travelled and transmitting the auditable record to the backend server, and no other location information is transmitted to the backend server.

10. The method of claim 9, further comprising, prior to performing the method of claim 9, the device detecting that the vehicle has been turned on.

11. The method of claim 10, wherein determining that the vehicle has been turned on comprises detecting an automatic wireless link has been established with an audio system of the vehicle.

12. A method, comprising:
performing a set up process including:
at a cellular telephone device, connecting over a wireless link to a vehicle audio system, and obtaining a media access control (MAC address of the vehicle audio system of a vehicle;
the cellular telephone device, while connected to the vehicle audio system, performing an optical character recognition of a vehicle identification number (VIN) of the vehicle;
responsive to the cellular telephone device recognizing the VIN, the cellular telephone device associating the MAC address with the VIN in storage by the cellular telephone device;
subsequent to performing the set up process, the cellular telephone device detecting that the vehicle has been turned on based on the cellular telephone device automatically connecting the vehicle audio system and receiving the MAC address from the vehicle audio system;
responsive to detecting that the vehicle has been turned on, the cellular telephone device determining a present location of the vehicle;
responsive to determining the present location of the vehicle, transmitting the present location to a backend server;
receiving from the server a geofence definition for a region including the present location;
response to receiving the geofence definition, commencing periodically and repeatedly determining a new location fix including a location and time and storing each new location fix to create a plurality of stored location fixes, wherein each new location is stored locally in the cellular telephone device only, and not transmitted to any remote equipment, while the vehicle is turned on;
while periodically and repeatedly determining each new location the device comparing each new location to the geofence definition;
determining that the vehicle has left a region corresponding to the geofenced definition and in response determining, from the plurality of stored location fixes, a total distance driven in the geofenced definition and transmitting the total distance driven to the backend server;
the device determining that the vehicle has been turned off;
responsive to the cellular telephone device determining that the vehicle has been turned off, the device determining a distance drive in the geofence definition and transmitting the distance driven and a geofence definition identifier to the backend server; and
the cellular telephone device creating an auditable record by selecting a subset of the location fixes and transmitting the auditable record to the backend server, and no other location information is transmitted to the backend server.

* * * * *